(12) United States Patent
Poletti et al.

(10) Patent No.: US 12,117,646 B2
(45) Date of Patent: Oct. 15, 2024

(54) HOLLOW-CORE OPTICAL FIBERS

(71) Applicant: University of Southampton, Southampton (GB)

(72) Inventors: Francesco Poletti, Southampton (GB); Seyedmohammad Abokhamis Mousavi, Southampton (GB)

(73) Assignee: University of Southampton, Southampton (GB)

( * ) Notice: Subject to any disclaimer, the term of this patent is extended or adjusted under 35 U.S.C. 154(b) by 0 days.

(21) Appl. No.: 17/333,060

(22) Filed: May 28, 2021

(65) Prior Publication Data

US 2022/0011502 A1  Jan. 13, 2022

Related U.S. Application Data

(63) Continuation of application No. 16/190,717, filed on Nov. 14, 2018, now abandoned, which is a
(Continued)

(30) Foreign Application Priority Data

Jun. 6, 2014 (GB) .................................. 1410100

(51) Int. Cl.
*G02B 6/02* (2006.01)
*G02B 6/024* (2006.01)
(Continued)

(52) U.S. Cl.
CPC ..... *G02B 6/02328* (2013.01); *G02B 6/02357* (2013.01); *G02B 6/024* (2013.01);
(Continued)

(58) Field of Classification Search
CPC ............ G02B 6/02328; G02B 6/02357; G02B 6/024; G02B 6/255; H01S 3/06712; H01S 3/06729; H01S 3/168
See application file for complete search history.

(56) References Cited

U.S. PATENT DOCUMENTS 3,678,420 A * 7/1972 Alsberg .................... H01P 3/13
  333/239
6,573,813 B1 * 6/2003 Joannopoulos .... G02B 6/02042
  333/242
(Continued)

FOREIGN PATENT DOCUMENTS

CN  1760704 A  4/2006
WO  2003/050571  6/2003
(Continued)

OTHER PUBLICATIONS

Belardi et al., JC 2013, 'Effect of core boundary curvature on the confinement losses of hollow antiresonant fibers', Optics Express, vol. 21, No. 19, pp. 21912-21917. https://doi.org/10.1364/OE.21.021912 (Year: 2013).*
(Continued)

*Primary Examiner* — Peter Radkowski

(57) ABSTRACT

An anti-resonant hollow-core fiber comprising a first tubular, cladding element which defines an internal cladding surface, a plurality of second tubular elements which are attached to the cladding surface and together define a core with an effective radius, the second tubular elements being arranged in spaced relation and adjacent ones of the second tubular elements having a spacing therebetween, and a plurality of third tubular elements, each nested within a respective one of the second tubular elements.

20 Claims, 27 Drawing Sheets

Related U.S. Application Data continuation of application No. 15/316,566, filed as application No. PCT/EP2015/062744 on Jun. 8, 2015, now Pat. No. 10,139,560.

(51) Int. Cl.
  *G02B 6/255* (2006.01)
  *H01S 3/067* (2006.01)
  *H01S 3/16* (2006.01)

(52) U.S. Cl.
  CPC .......... *G02B 6/255* (2013.01); *H01S 3/06712* (2013.01); *H01S 3/06729* (2013.01); *H01S 3/1618* (2013.01)

(56) References Cited

U.S. PATENT DOCUMENTS

| | | | | |
|---|---|---|---|---|
| 7,321,712 | B2* | 1/2008 | Williams | C03B 37/02781 385/125 |
| 7,356,233 | B2* | 4/2008 | Fini | G02B 6/02328 385/127 |
| 7,366,388 | B2* | 4/2008 | Roberts | C03B 37/016 65/393 |
| 7,532,798 | B2* | 5/2009 | Williams | C03B 37/0124 385/125 |
| 7,865,051 | B2* | 1/2011 | Fini | G02B 6/02328 385/125 |
| 7,907,810 | B2* | 3/2011 | Messerly | G02B 6/03611 365/126 |
| 8,798,422 | B2* | 8/2014 | Messerly | C03B 37/01807 385/127 |
| 9,170,367 | B2* | 10/2015 | Messerly | G02B 6/02338 |
| 2002/0024727 | A1* | 2/2002 | Wilcox | H01S 3/067 359/342 |
| 2005/0157998 | A1 | 7/2005 | Dong et al. | |
| 2005/0185908 | A1* | 8/2005 | Roberts | C03B 37/016 385/125 |
| 2005/0226578 | A1 | 10/2005 | Mangan et al. | |
| 2005/0232560 | A1 | 10/2005 | Knight et al. | |
| 2005/0276556 | A1* | 12/2005 | Williams | C03B 37/0122 385/123 |
| 2006/0263024 | A1 | 11/2006 | Dong et al. | |
| 2007/0009216 | A1* | 1/2007 | Russell | B29D 11/00721 385/125 |
| 2007/0242923 | A1* | 10/2007 | Fini | G02B 6/02328 385/125 |
| 2008/0138023 | A1* | 6/2008 | Williams | C03B 37/0124 385/125 |
| 2008/0260338 | A1* | 10/2008 | Messerly | G02B 6/03611 385/127 |
| 2010/0002980 | A1* | 1/2010 | Fini | G02B 6/105 385/11 |
| 2010/0054742 | A1 | 3/2010 | Imamura | |
| 2012/0321260 | A1* | 12/2012 | Messerly | G02B 6/03688 65/412 |
| 2013/0202264 | A1* | 8/2013 | Messerly | G02B 6/02338 385/123 |
| 2013/0209046 | A1* | 8/2013 | Tanigawa | G02B 6/02009 385/126 |
| 2013/0294468 | A1* | 11/2013 | Sridharan | H01S 3/2333 372/29.02 |

FOREIGN PATENT DOCUMENTS

| | | |
|---|---|---|
| WO | 2004/083918 | 9/2004 |
| WO | 2009/010317 | 1/2009 |

OTHER PUBLICATIONS

Birks et al., Strictly-bound modes of an idealised hollow-core fibre without a photonic bandgap, 36th European Conference and Exhibition on Optical Communication, 2010, pp. 1-3, doi: 10.1109/ECOC.2010.5621219. (Year: 2010).*

Couny et al., Generation and Photonic Guidance of Multi-Octave Optical-Frequency Combs Science Nov. 16, 2007 vol. 318, Issue 5853 pp. 1118-1121 DOI: 10.1126/science.1149091 (Year: 2007).*

Jaworski et al., Picosecond and nanosecond pulse delivery through a hollow-core Negative Curvature Fiber for micro-machining applications, Opt. Express 21, 22742-22753 (2013) (Year: 2013).*

Kang et al., Photonic crystal with multiple-hole defect for sensor applications, Opt. Express 16, 18188-18193 (2008) (Year: 2008).*

Kilic et al., Controlling uncoupled resonances in photonic crystals through breaking the mirror symmetry, Opt. Express 16, 13090-13103 (2008) (Year: 2008).*

Kosolapov et al., Demonstration of CO2-laser power delivery through chalcogenide-glass fiber with negative-curvature hollow core. Opt Express. Dec. 5, 2011;19(25):25723-8. doi: 10.1364/OE.19.025723. PMID: 22273964 (Year: 2011).*

Kurt et al., Crescent shaped dielectric periodic structure for light manipulation, Opt. Express 20, 7184-7194 (2012) (Year: 2012).*

Messerly et al., Field-flattened, ring-like propagation modes, Optics Express, V. 21, N. 10, May 16, 2013 (Year: 2013).*

Messerly et al., Patterned flattened modes, Optics Letters, V. 38, N. 17, Sep. 1, 2013 (Year: 2013).*

Roberts, P.J., Birefringent hollow core fibers, Proc. SPIE 6782, Optoelectronic Materials and Devices II, 67821R (Nov. 19, 2007); doi: 10.1117/12.754405 (Year: 2007).*

Rugeland et al., Visible light guidance in silica capillaries by antiresonant reflection, Opt. Express 21, 29217-29222 (2013) (Year: 2013).*

Urich et al., Flexible delivery of Er:YAG radiation at 2.94 μm with negative curvature silica glass fibers: a new solution for minimally invasive surgical procedures, Biomed. Opt. Express 4, 193-205 (2013) (Year: 2013).*

Wang et al., Low loss broadband transmission in hypocycloid-core Kagome hollow-core photonic crystal fiber, Opt. Lett. 36, 669-671 (2011) (Year: 2011).*

Smith, C., Venkataraman, N., Gallagher, M. et al. Low-loss hollow-core silica/air photonic bandgap fibre. Nature 424, 657-659 (2003). https://doi.org/10.1038/nature01849 (Year: 2003).*

West et al., Surface Modes in Photonic Band-Gap Fibers, in Photonic Metamaterials: From Random to Periodic, OSA Technical Digest (CD) (Optica Publishing Group, 2007), paper TuB1. (Year: 2007).*

West et al., Surface modes in air-core photonic band-gap fibers, Opt. Express 12, 1485-1496 (2004) (Year: 2004).*

Amezcua-Correa et al., Optimizing the usable bandwidth and loss through core design in realistic hollow-core photonic bandgap fibers, Opt. Express 14, 7974-7985 (2006) (Year: 2006).*

Roberts et al., Realizing low loss air core photonic crystal fibers by exploiting an antiresonant core surround, Opt. Express 13, 8277-8285 (2005). (Year: 2005).*

João Torres, António Baptista, and Victor Maló Machado, "Coupling Analysis in Concentric Ring Waveguides," J. Lightwave Technol. 31, 2140-2145 (2013) (Year: 2013).*

Pryamikov et al., Demonstration of a waveguide regime for a silica hollow—core microstructured optical fiber with a negative curvature of the core boundary in the spectral region > 3.5 μm, Opt. Express 19(2), 1441-1448 (2011), http://www.opticsinfobase.org/oe/abstract.cfm?URI=oe-19-2-1441. (Year: 2011).*

Basmajian, Ara, Hyperbolic Structures for Surfaces of Infinite Type, Transaction of the American Mathematical Society, V. 336, N. Mar. 1, 1993. (Year: 1993).*

Kolyadin et al., Light transmission in negative curvature hollow core fiber in extremely high material loss region, Opt. Express 21, 9514-9519 (2013). (Year: 2013).*

Yu et al., Low loss silica hollow core fibers for 3-4 μm spectral region, Opt. Express 20, 11153-11158 (2012). (Year: 2012).*

Yang et al., Design of high birefringence and low confinement loss photonic crystal fibers with five rings hexagonal and octagonal symmetry air-holes in fiber cladding. J. Appl. Phys. May 1, 2011; 109 (9): 093103. (Year: 2011).*

(56) References Cited

OTHER PUBLICATIONS

Clark et al., Tuneable visible resonances in crescent shaped nano-split-ring resonators. Appl. Phys. Lett. Aug. 27, 2007; 91 (9): 093109. (Year: 2007).*
Abutahoun et al., A Crescent Shaped Split Ring Resonator to Form a New Metamaterial, International Journal of Engineering and Technology vol. 2 No. 10, Oct. 2012 (Year: 2012).*
Basmajian, Ara, Hyperbolic Structures for Surfaces of Infinite Type, Transaction of the American Mathematical Society, V. 336, N. 1 , Mar. 1993. (Year: 1993).*
Wu et al. Optical properties of the crescent-shaped nanohole antenna. Nano Lett. May 2009;9(5):1956-61. doi: 10.1021/nl9001553. PMID: 19354226; PMCID: PMC2792927. (Year: 2009).*
International Search Report and Written Opinion for corresponding Patent Application No. PCT/EP2015/062744 dated Aug. 26, 2015.
Belardi, "Fabrication of a Double Antiresonant Fibre", Google Photos, Sep. 2013.
Belardi et al., "Negative curvature fibers with reduced leakage loss", OFC 2014, pp. 1-3 and 9, Mar. 2014.
Belardi et al., "Hollow antiresonant fibers with reduced attenuation", Optics Letters, vol. 39, Issue 7, pp. 1853-1856, Apr. 1, 2014.
Belardi et al., "Hollow antiresonant fibers with low bending loss", Optics Express, vol. 22, Issue 8, pp. 10091-10096, Apr. 18, 2014.
Belardi et al., "Negative curvature fibers with reduced leakage loss", Optical Fiber Communication Conference 2014, San Francisco, CA/USA, Mar. 9-13, 2014.
Fini et al., "Polarization maintaining single-mode low-loss hollow-core fibres", Nature Communications, vol. 5, p. 5085, Oct. 28, 2014.
Fokoua et al., "Predicting structural and optical properties of hollow-core photonic bandgap fibers from cane structural information," At Conference on Optical Fibre Communications OFC '13, United States. Mar. 17-21, 2013. (doi:10.1364/OFC.2013.OTh1J.1).
Fokoua et al., "Real-time prediction of structural and optical properties of hollow-core photonic bandgap fibers during fabrication," Optics Letters, V. 38, N. 9, May 2013, p. 1382.
Kolyadin et al., "Light transmission in negative curvature hollow core fiber in extremely high material loss region", Optics Express, vol. 21, Issue 8, pp. 9514-9519, Apr. 10, 2013.
Morioka et al., "Enhancing optical communications with brand new fibers," in IEEE Communications Magazine, vol. 50, No. 2, pp. s31-s42, Feb. 2012.
Nagayama et al., "Ultra-low-loss (0.1484 dB/km) pure silica core fibre and extension of transmission distance", Electronics Letters, vol. 38, No. 20, pp. 1168-1169, Sep. 26, 2002.
Noda et al., "Polarization—Maintaining Fibers and Their Applications," Journal of Lightwave Technology, vol. LT-4, No. 8, Aug. 1986.
Poletti et al., "Optimising the Performances of Hollow Antiresonant Fibres," European Conference on Optical Communication (ECOC) 2011, paper No. 2.
Poletti et al., "Towards high-capacity fibre-optic communications at the speed of light in vacuum," Nature Photonics, vol. 7, pp. 279-284, 2013.
Roberts et al., "Ultimate low loss of hollow-core photonic crystal fibres", Optics Express, No. 13, pp. 236-244, 2005.
Saitoh et al., "Photonic Bandgap Fibers With High Birefringence", IEEE Photonics Technology Letters, vol. 14, No. 9, pp. 1291-1293, Sep. 1, 2002.
Terrel et al., "Resonant Fiber Optic Gyroscope Using an Air-Core Fiber", Journal of Lightwave Technology, vol. 30, No. 7, pp. 931-937, Apr. 1, 2012.
Vincetti et al., "Waveguiding mechanism in tube lattice fibers", Optics Express, vol. 18, pp. 23133-23146, 2010.
A.D. Pryamikov et al., "Transmission of CO2 Laser Radiation Through Glass Hollow Core Microstructured Fibers," CO2 Laser—Optimisation and Application, Fiber Optics Research Center of Russian Academy of Sciences, Russian Federation, pp. 227-248, 2012.
Birks et al., "Strictly-Bound Modes of an Idealised Hollow-Core Fibre Without a Photonic Bandgap," ECOC 2010, We.6.D.2 (Year: 2010).
Kang et al., "Photonic crystal with multiple-hole defect for sensor applications," Optics Express, V. 16, N. 22, 2008 (Year: 2008).
Urich et al., Flexible delivery of Er:YAG radiation at 2.94 μm with negative curvature silica glass fibers: a new solution for minimally invasive surgical procedures, Biomedical Optic Express, V. 4, N. 2, 2013 (Year: 2013).
H. Kurt, M. Turduev, and I. H. Giden, "Crescent shaped dielectric periodic structure for light manipulation," Opt. Express 20, 7184-7194 , 2012 (Year: 2012).
Alharbi et al., "Hypocycloid-shaped hollow-core photonic crystal fiber Part II: Cladding effect on confinement and bend loss," Optics Express, V. 21, N. 23, 2013 (Year: 2013).
Kilic et al., "Controlling uncoupled resonances in photonic crystals through breaking the mirror symmetry," Optics Express, V. 16, N. 17, 2008 (Year: 2008).

* cited by examiner

HOLLOW-CORE OPTICAL FIBERS

This application is a continuation of U.S. patent application Ser. No. 16/190,717 filed Nov. 14, 2018, which is a continuation of U.S. patent Ser. No. 15/316,566 filed Dec. 6, 2016 (now U.S. Pat. No. 10,139,560), which is a national phase of International Application No. PCT/EP2015/062744 filed Jun. 8, 2015, which claims priority of United Kingdom Patent Application No. 1410100.0 filed Jun. 6, 2014, all of which are incorporated herein by reference.

The present invention relates to hollow-core optical fibers, in particular anti-resonant fibers, and especially ultra-low loss fibers, wide bandwidth fibers, single-mode hollow-core fibers and high bi-refringence (Hi-Bi) fibers.

Hollow-core optical fibers have been studied and developed for nearly eighty years. In principle, by guiding light in air rather than in a solid material, these fibers could allow ultra-low propagation loss and non-linearity, as well as providing significantly higher propagation speeds (i.e. reduced latency) and laser-induced damage thresholds than an all-solid fibers. In practice, however, it has not yet been possible to reduce the loss to levels comparable to the ~0.15 dB/km possible with all-glass fibers, and this has prevented widespread application of the hollow-core technology.

There are two main types of single-material hollow core fibers, these being based on either photonic bandgap guidance (photonic bandgap fibers—PBGFs) or on anti-resonant guidance (anti-resonant fibers—ARFs, such as Kagóme fibers, 'negative curvature' fibers, simplified anti-resonant fibers and hexagram fibers).

PBGFs offer the lowest loss (with attenuation as low as 1.2 dB/km at a wavelength of 1.62 $\mu$m—Roberts et al, "Ultimate Low Loss of Hollow-Core Photonic Crystal Fibres", Optics Express, No 13, pages 236 to 244, 2005), but over a narrow bandwidth (10-30% of the central wavelength), while ARFs offer a bandwidth enlargement factor of 2 to 10 times that of PBGFs, but with a higher straight loss and a more pronounced bend sensitivity.

In PBGFs, guidance is achieved by anti-resonance from an array of ordered and suitably-sized rods in the cladding. As the number of rods in the radial direction can be increased at will, the leakage or confinement loss can be made arbitrarily small. However, the rods need to be interconnected by thin glass struts which do not operate with optimum anti-resonance. Accordingly, electromagnetic field is not efficiently repelled by the glass boundaries, which are inherently 'rough' (at least at the atomic/molecular scale), and this creates surface scattering, which is the dominant source of loss in PBGFs.

In ARFs, in contrast, it is the anti-resonance from uniformly-sized glass struts which surround the core that confines the light in air. Since the struts are very efficient at expelling light, scattering loss is typically negligible in ARFs. However, no arrangement has been devised which allows multiple layers to reflect coherently the light that tends to leak out from the core. Accordingly, leakage loss typically dominates in ARFs. Another issue with ARFs is the presence of nodes that form at the intersections between glass struts, especially as these nodes have different and variable thicknesses and introduce spurious and spectrally-dense resonances within the anti-resonant region, thus increasing the loss.

Fibers have been developed to address this problem by forming a core surround with a 'negative curvature', such that the nodes are pushed further away from the air-guided mode.

In addition, a fiber has been developed which eliminates unwanted nodes entirely, by producing a lattice of non-touching tubes (Kolyadin et al, Optics Express, Vol 21, pages 9514 to 9519, 2013). The nodeless tube lattice of this fiber comprises a silica ring including eight anti-resonant elements at the cladding surface, each being in non-touching relation, and represents the current state of the art in terms of fabricated ARFs, exhibiting transmission bands in the spectral range of from 2.5 $\mu$m to 5 $\mu$m with a minimum loss level of 4 to 5 dB/m and average losses in the spectral bands at 5.8 $\mu$m and 7.7 $\mu$m of 30 dB/m and 50 dB/m, respectively.

However, the confinement loss in this fiber is still considerably higher than the scattering loss. This is because light confinement is effectively caused by only one glass strut azimuthally oriented via two Fresnel reflections at the glass-air boundaries.

More recently, a noded ARF has been proposed (Belardi et al, Optics Letters, Vol 39, pages 1853 to 1856, 2014), which comprises a silica ring including eight primary anti-resonant elements at the cladding surface, each being in touching relation, and at least one further anti-resonant element nested within each of the primary anti-resonant elements.

The present invention aims to provide an improved fiber structure, in particular a novel fiber structure which offers an attenuation loss which is comparable to or lower than PBGFs and a bandwidth as wide as in ARFs.

In one aspect the present invention provides an anti-resonant hollow-core fiber comprising a first tubular, cladding element which defines an internal cladding surface, a plurality of second tubular elements which are attached to the cladding surface and together define a core with an effective radius, the second tubular elements being arranged in spaced relation and adjacent ones of the second tubular elements having a spacing therebetween, and a plurality of third tubular elements, each nested within a respective one of the second tubular elements.

In one embodiment the second tubular elements are arranged in symmetrical relation at the cladding surface.

In one embodiment the first tubular element is circular in section.

In one embodiment the second tubular elements are circular in section.

In another embodiment the second tubular elements have a longer dimension in a radial direction than a tangential direction, optionally elliptical or oval in section.

In one embodiment one or more of the tubular elements have different sectional shape.

In one embodiment the tubular elements are formed of glass, optionally silica.

In one embodiment the tubular elements are formed of glass having a refractive index of at least about 1.4, optionally about 1.4 to about 3, optionally about 1.4 to about 2.8.

In one embodiment the second tubular elements are attached to the first tubular element each only at a single location on the cladding surface.

In one embodiment the third tubular elements are attached to the respective second tubular elements at the locations at which the second tubular elements are attached to the cladding surface.

In one embodiment a ratio of the spacing of the adjacent second tubular elements and a wall thickness of the second tubular elements is greater than about 0.5, optionally greater than about 0.8, optionally greater than about 1, and optionally greater than about 2.

In one embodiment a ratio of the spacing of the adjacent second tubular elements and a wall thickness of the second tubular elements is less than about 12, optionally less than about 10, optionally less than about 8, and optionally less than about 6.

In one embodiment the second and third tubular elements have substantially the same wall thickness.

In one embodiment a ratio of a radial spacing between radially-inner walls of the second and third tubular elements to the core radius is between about 0.3 and about 1.0, optionally between about 0.35 and about 0.95.

In another embodiment a ratio of a radial spacing between radially-inner walls of the second and third tubular elements to the core radius is between about 0.05 and about 0.4, optionally between about 0.1 and about 0.3, optionally between about 0.2 and about 0.3.

In a further embodiment a ratio of a radial spacing between radially-inner walls of the second and third tubular elements to the core radius is between about 0.8 and about 1.2, optionally between about 0.9 and 1.2, optionally between about 1.0 and about 1.2.

In one embodiment the fiber has a fundamental loss of less than 0.15 dB/km at wavelengths of between about 1.0 µm and about 2.5 µm.

In another embodiment the fiber has a fundamental loss of about 1 dB/km at wavelengths of up to about 2.7 µm.

In a further embodiment the fiber has a fundamental loss of less than 1 dB/m at wavelengths of up to about 5 µm.

In a still further embodiment the fiber has a fundamental loss of less than 4 dB/m at wavelengths of up to about 7 µm.

In a yet further embodiment the fiber has a fundamental loss of less than about 1 dB/km at wavelengths of down to about 0.8 µm.

In one embodiment a fraction of an optical power guided by the fiber in a material of the tubular elements is less than about $1 \times 10^{-3}$, optionally less than about $1 \times 10^{-4}$.

In one embodiment the core radius is optionally less than about 50 µm, optionally less than about 40 µm, optionally less than about 30 µm, optionally less than about 25 µm, optionally less than about 20 µm, optionally less than about 15 µm, optionally less than about 13 µm.

In one embodiment the fiber includes six nested arrangements of tubular elements.

In another embodiment the fiber includes three, four or five nested arrangements of tubular elements.

In one embodiment the fiber exhibits an effective single mode.

In one embodiment a differential between a fundamental mode and a lowest-loss high-order mode is at least one order or magnitude, optionally at least two orders of magnitude.

In one embodiment the nested arrangement of tubular elements supports a mode having an effective index (neff) which has a differential in the effective mode (Δneff) of less than about 0.001 to that of the higher-order mode in the core.

In one embodiment the fiber allows any mode field diameter (MFD) to be selected for any given wavelength.

The present invention also extends to the above-described fiber in combination with a solid-core fiber, and optionally directly spliced thereto, wherein the hollow-core fiber has a mode field diameter which is matched to that of the solid-core fiber.

In one embodiment the solid-core fiber is a fiber from fiber laser, optionally an ytterbium-doped fiber laser.

In one embodiment a differential in a fundamental loss between the fiber when straight and when coiled to a diameter of 10 mm is less than two orders of magnitude, optionally less than one order of magnitude, optionally less than half an order or magnitude.

In one embodiment the fiber further comprises a plurality of fourth tubular elements which are each nested within respective ones of the third tubular elements.

In one embodiment the second, third and fourth tubular elements have substantially the same wall thickness.

The present invention also extends to use of the above-described fiber in an effective single mode.

The present invention further extends to use of the above-described fiber with any selected mode field diameter for any given wavelength.

The present invention still further extends to use of the above-described fiber in a mode of reduced fundamental loss.

With the present invention, a total propagation loss (i.e. including scattering, confinement, bend and material absorption loss) is predicted which is even lower than conventional telecoms fibers, down to 0.05 dB/km. This low loss, combined with a low non-linearity and a wide operational bandwidth (again, wider than current solid fibers) provides an ideal high-capacity data transmission medium.

The present invention also aims to provide high bi-refringence (Hi-Bi) hollow-core anti-resonance fibers which either are polarizing-maintaining (PM) fibers, that is, maintain an input polarization of a source signal, or are polarizing (P) fibers, that is, introduce a polarization to a source signal, for example, producing linearly-polarized light from an unpolarized input.

High bi-refringence (Hi-Bi) fibres are widely used in optical communication systems, sensing and interferometric devices, where preserving the source polarisation is essential. In solid core polarization-maintaining (PM) fibres, the Hi-Bi effect is achieved by applying ether stress or anisotropy, through an elliptic core, to the fiber[1] but the non-linearity of the fiber and/or the sensitivity of the fiber to external perturbations, such as temperature, can limit the performance of fabricated devices (J Noda et al, "Polarization-maintaining fibers and their applications,"J Lightwave Technol, Vol 4, pages 1071 to 1089, 1986). Owing to their unique low non-linearity and high insensitivity to thermal environmental variations, hollow-core (HC) fibres could represent an alternative for use within high-precision sensors, e.g. in gas spectroscopy or in fiber-optic gyroscopes (FOG) (M A Terrel et al, "Resonant fiber optic gyroscope using an air-core fiber", *J Lightwave Technol*, Vol 30, pages 931 to 937, 2012). However, high-performance, low-loss hollow-core fibers with polarisation-maintaining properties are not readily available. Polarization-maintaining hollow-core fibers, based on photonic band gap (PBG) guidance, have been presented recently (J M Fini et al, "Polarization maintaining single-mode low-loss hollow-core fibres", Nat Commun, Vol 5, page 5085, 2014). In these fibers, which have a different guidance mechanism, the polarizing-maintaining property is typically achieved by exploiting the anti-crossing of core-clad modes instead of the conventional methods of solid-core fibers. However, these fibers exhibit a fairly-high propagation loss and their operation is sensitive to external perturbations.

The present inventors have recognized that a nested anti-resonance nodeless design allows greater control of structural parameters than photo-bandgap fibers, and enables the provision of hollow-core fibers with improved polarizing maintaining properties and also polarizing properties, based for the first time on anti-resonance guidance.

In one embodiment the second, outer tubular element of at least one of the nested tubular arrangements has a wall thickness $t_1$ which is different to that of a wall thickness $t_2$ of the second, outer tubular element of at least one of the other nested tubular arrangements, whereby the fiber is phase bi-refringent and polarizing-maintaining and/or polarizing.

In one embodiment the relationship of the wall thickness $t_1$ of the outer tubular element of the at least one of the nested tubular arrangements to the wall thickness $t_2$ of the outer tubular element of the at least one other of the nested tubular arrangements is 0.5 $t_2<t_1<t_2$ or 1.5 $t_2>t_1>t_2$, optionally 0.4 $t_2<t_1<t_2$ or 1.4 $t_2>t_1>t_2$, optionally 0.3 $t_2<t_1<t_2$ or 1.3 $t_2>t_1>t_2$.

In one embodiment the relationship of the wall thickness $t_1$ of the outer tubular element of the at least one of the nested tubular arrangements to the wall thickness $t_2$ of the outer tubular element of the at least one other of the nested tubular arrangements is $t_1<0.9\ t_2$ or $t_1>1.1t_2$.

In one embodiment the second, outer tubular elements of first and second of the nested tubular arrangements have a wall thickness which is different to that of the wall thickness of the second, outer tubular element of at least one other of the nested tubular arrangements.

In one embodiment the first and second tubular arrangements are disposed in generally opposed relation, optionally diametral relation.

In one embodiment the fiber comprises two, three, four, five, six, seven or eight nested tubular arrangements.

In one embodiment the fiber comprises four nested tubular arrangements, wherein a first pair of the nested tubular arrangements are arranged in a first substantially common direction and a second pair of the nested tubular arrangements are arranged in a second substantially common direction which is substantially orthogonal to the first substantially common direction.

In one embodiment the effective radius of the core of the fiber is at most about 15 times the wavelength λ of the source, optionally at most about 7 times, optionally at most about 5 times, optionally the wavelength λ is about 0.5, 0.8, 1.06, 1.55 or 2 μm.

In one embodiment one inner tubular element, optionally the innermost tubular element, of the at least other of the nested tubular arrangements has a sectional size and/or shape which is different to the counterpart one tubular element of the at least one of the nested tubular arrangements, whereby a spacing $Z_1$ between the one inner tubular element and an adjacent tubular element of the at least other of the nested tubular arrangements is different to a spacing $Z_2$ between the counterpart one tubular element and adjacent tubular element of the at least one of the nested tubular arrangements.

In one embodiment the one inner tubular element of the at least other of the nested tubular arrangements has a different sectional size.

In one embodiment the relationship of the spacing $Z_1$ of the at least one other of the nested tubular arrangements to the spacing $Z_2$ of the at least one of the nested tubular arrangements is $Z_1>1.2\ Z_2$, optionally $Z_1>1.5\ Z_2$, optionally $Z_1>2\ Z_2$, optionally $Z_1>2.5\ Z_2$.

In one embodiment the fiber exhibits a phase bi-refringence of at least $1\times10^{-4}$.

In one embodiment the fiber exhibits a loss of at most about 0.1 dB/m, optionally at most about 0.01 dB/m.

In one embodiment the fiber exhibits a loss ratio of at least about 100, optionally at least about 200, optionally at least about 500, optionally at least about 1000, between orthogonal polarizations of the fundamental mode.

The present invention also extends to use of the above-described fiber as a polarizing-maintaining fiber, optionally maintaining an input polarization of a source signal.

The present invention further extends to use of the above-described fiber as a polarizing fiber, optionally introducing a polarization to a source signal, optionally producing linearly-polarized light from an unpolarized input.

The present invention has numerous application areas, which include:

Optical Data Communications

The fiber of the present invention should be able to guide light with propagation losses below 0.15 dB/km, which represents a fundamental physical limit in current telecoms fibers, and also with a broader useable bandwidth. Differently from all other hollow-core fibers currently in existence, the fiber of the present invention is also able to operate with effectively single-mode behaviour, which is desirable in order to avoid intermodal distortions when transmitting data. Combining ultra-low loss with a non-linearity that is typically three orders of magnitude lower than in a glass-guiding fiber, the present invention can offer a significant increase in transmission capacity over existing fibers.

Low Latency Data Transmission

Guiding light in air provides for transmission speeds which are 30% greater than standard fibers, a feature which has particular application to algorithmic trading companies, which require low latency.

Low latency also has application in datacenter/supercomputer applications, where hundreds of kilometers of optical cables are used to interconnect thousands of servers. The ability of the fiber of the present invention to exhibit ultra-low loss at any given wavelength allows these ultra-low latency fibers to operate at wavelengths of ~0.8 μm, a wavelength often used for intra-datacenter interconnection as it allows the use of cheaper VCSEL transmitter technology.

Radiation Hardness

The fiber of the present invention provides a radiation hardness which is of interest for transmission of data synchronisation signals in high-energy physics experiments and in space missions, where operation at mid-IR wavelengths would also be an additional requirement.

High Power Delivery

The fiber of the present invention can be configured such that less than 0.1%, and in some configurations less than 0.01%, of the optical power is guided in the glass, and the output mode field diameter (MFD) of which is easily tailorable to that of a fiber laser operating at any wavelength, e.g. 0.8 μm, 1 μm, 1.55 μm and 2 μm. The fibers also have a bend robustness which is significantly superior to that of any solid fiber with a comparable effective area, and are effectively single moded. These features enable application as a power delivery fiber for high-power fiber lasers in industrial manufacturing, especially for pulsed operation where the peak powers involved induce detrimental non-linear spectral broadening and temporal pulse distortion, or could even exceed the damage threshold of the material. The considerable reduction in cross-sectional complexity as compared to PBGFs would also enable the stacking of arrays of such fibers to transmit undistorted ultra-short, high peak power pulses from multiple laser sources for subsequent coherent recombination, which would have use in laser-driven particle acceleration applications.

Mid-IR Gas Spectroscopy

The fibers of the present invention, in having a very small overlap of the optical power with glass (typically between $10^{-5}$ and $10^{-4}$), enable the transmission of light at wavelengths where the glass is highly opaque. This feature, combined with the fact that light is guided in a gaseous medium, allows use in spectroscopic applications in the mid-IR, where fundamental roto-vibrational absorptions of most molecules lie. Further applications include gas sensors, for example, in breath analysis for preventive cancer screening research. Where fabricated of fused silica, the fibers of the present invention should enable transmission with ~dB/m loss at wavelengths up to 6-6.5 µm. Furthermore, and differently from PBGF technology, the present invention can be applied to higher index glasses which are more transparent in the mid-IR, allowing potential transmission of wavelengths of up to 10 µm or more.

Biomedical Applications

The fibers of the present invention, in providing low-loss guidance of high-energy pulses at specific mid-infrared wavelengths, allows for surgical applications. Wavelengths of around 3 µm are, for example, currently used to ablate a wide variety of biological tissues due to the high absorption of water present in the tissues. The high fluence typically required for tissue ablation makes it impossible to use solid fibers, and current hollow fibers typically suffer from high bend loss, which is overcome by the present invention. Furthermore, the present invention allows application at shorter wavelengths, typically 0.8 µm to 1 µm, enabling application in endoscopes capable of transmitting intense pump pulses for the non-linear probing of molecules, for example, in the clinical assessment of cancer cell growth or in the real-time study of in-vivo cellular processes.

Gyroscopes and Temperature-Insensitive Fibers for Delivery Of Precise Frequency/Time Information The fibers of the present invention, in having an optical mode which travels largely through air, which has much smaller Kerr, Faraday and thermal constants than silica, exhibits far lower dependencies on power, magnetic field and temperature fluctuations. These characteristics have particular application in gyroscopes and in the niche application of temperature-insensitive fibers for the delivery of ultra-precise time stamps.

Preferred embodiments of the present invention will now be described hereinbelow by way of example only with reference to the accompanying drawings, in which.

Figure 25:
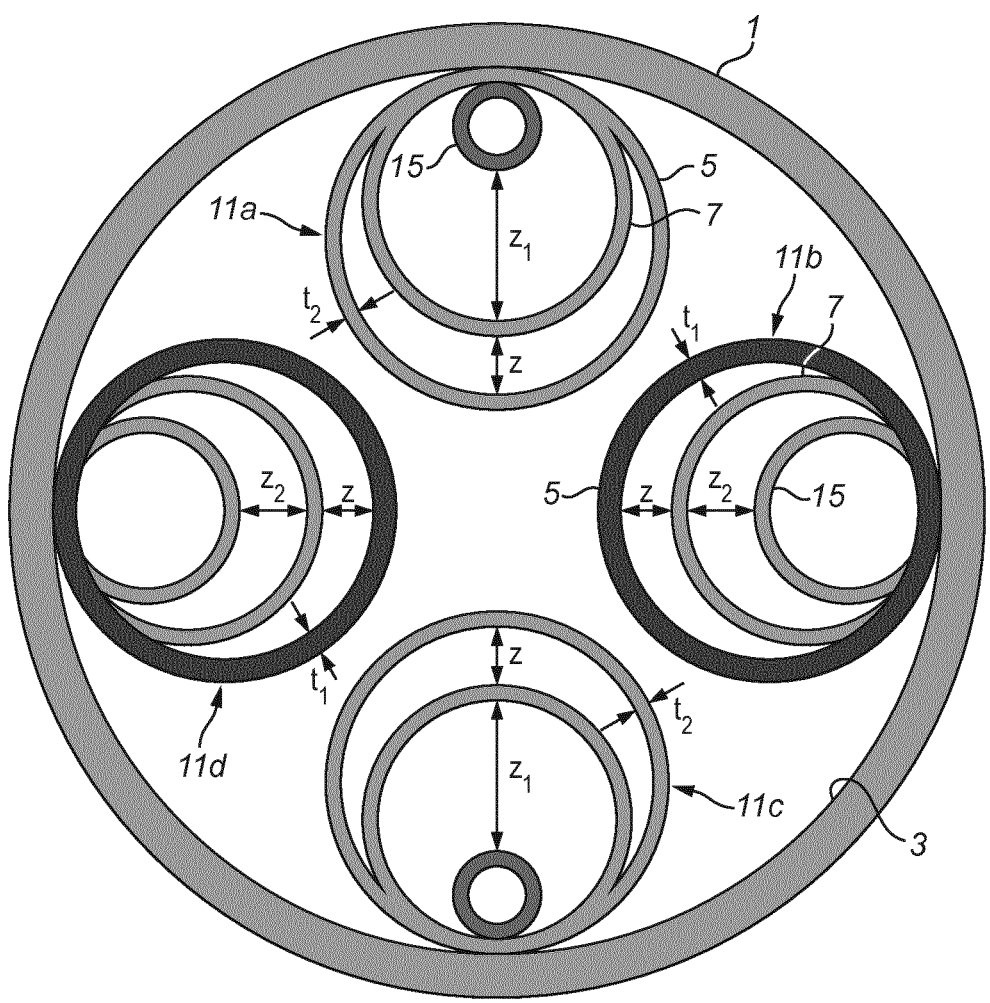
FIG. 25 illustrates a hollow-core anti-resonant fiber in accordance with a ninth embodiment of the present invention.
Figure 26A:
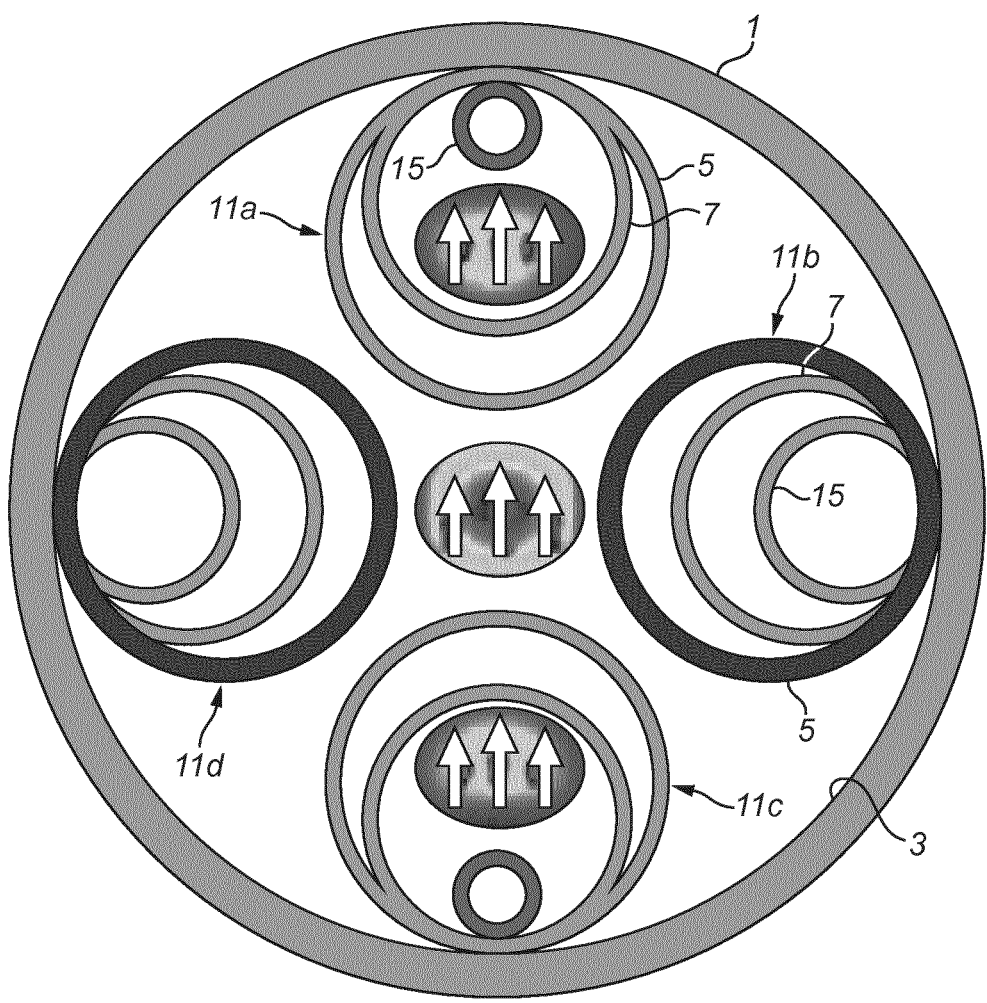
Figure 26B:
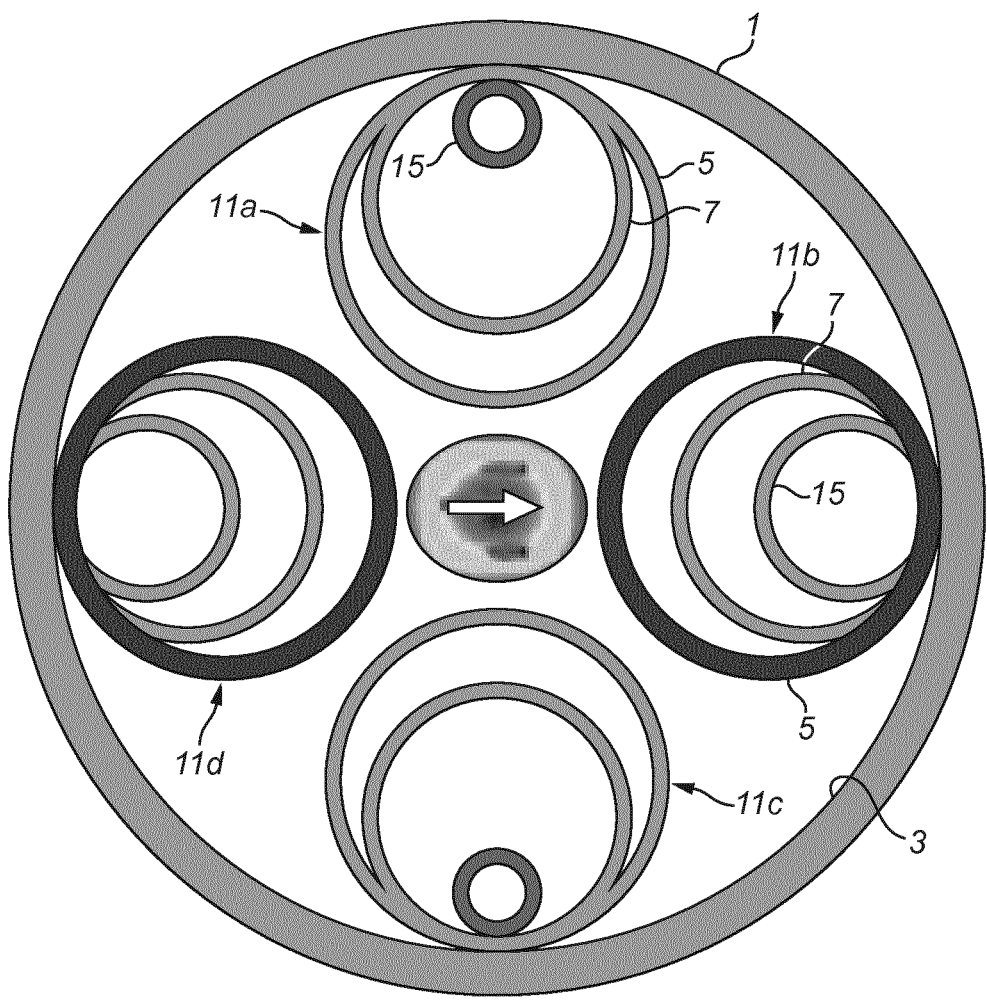
Figure 27A:
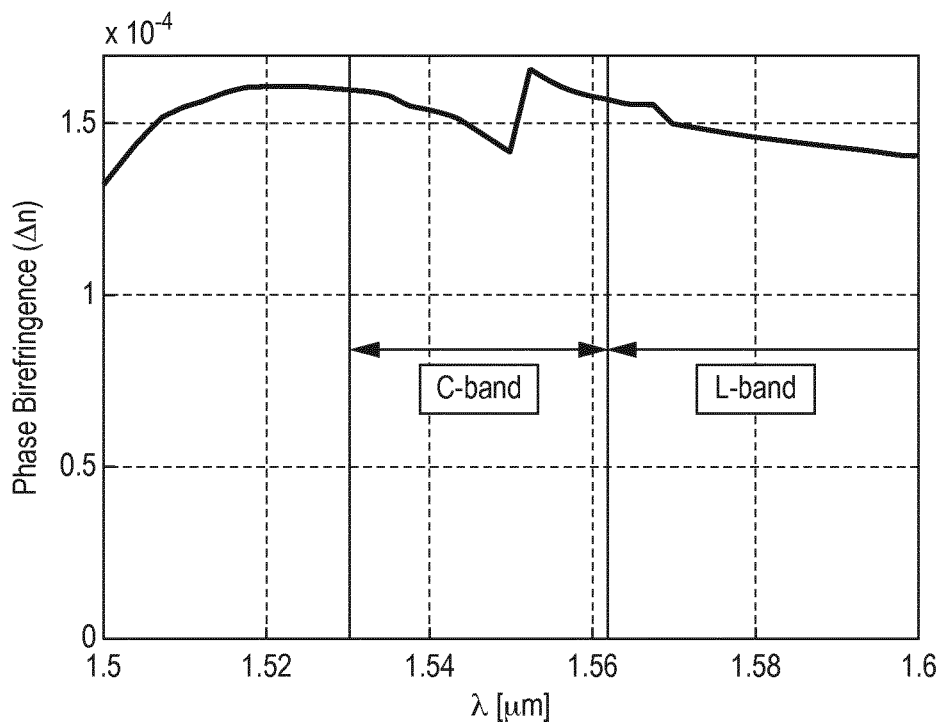
Figure 27B:
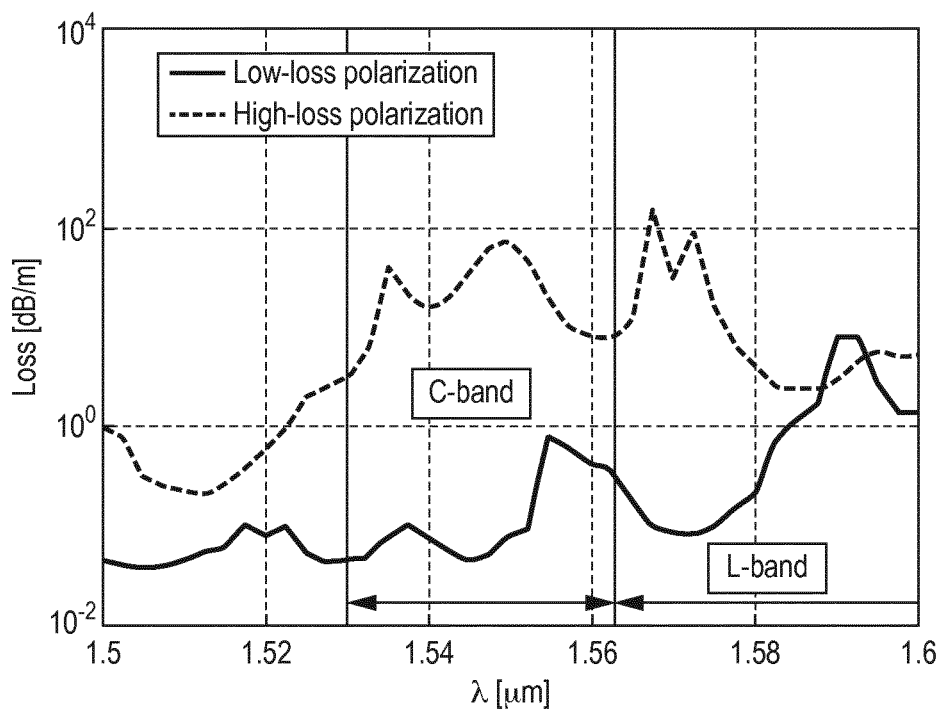
Figure 27C:
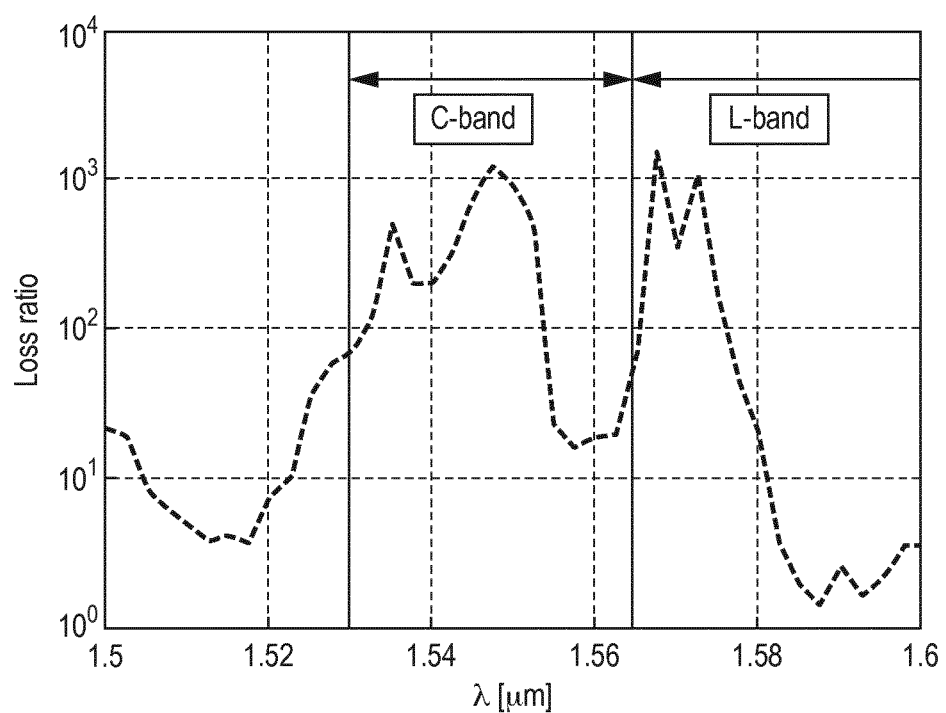

FIGS. 26(a) and (b) illustrate respectively the modal intensity profile and the electric field direction of the high-loss (y-polarised) and low-loss (x-polarised) orthogonal polarizations of the fundamental mode of the fiber of FIG. 25; and FIGS. 27(a) to (c) illustrate respectively the phase bi-refringence (PB), the loss and the loss ratio of the fiber of FIG. 25 as a function of wavelength in the range of between 1.5 μm and 1.6 μm.

Figure 1:
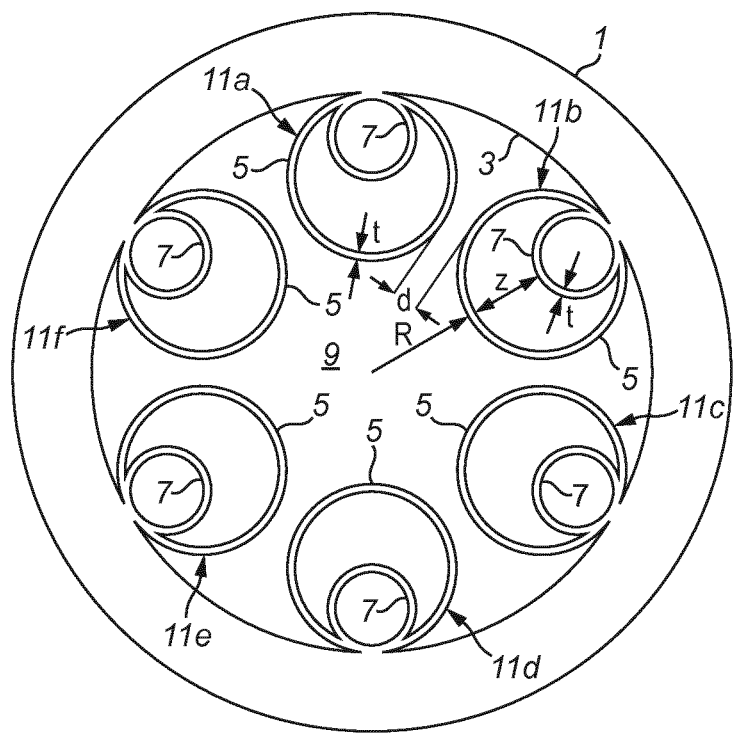
FIG. 1 illustrates a hollow-core anti-resonant fiber in accordance with a first embodiment of the present invention.

FIG. 1 illustrates a hollow-core anti-resonant fiber in accordance with a first embodiment of the present invention.

The fiber comprises a first tubular, cladding element 1 which defines an internal cladding surface 3, a plurality of second tubular elements 5 which are arranged in spaced, in this embodiment symmetrical, relation at the cladding surface 3 and together define a core 9 with a radius R, and a plurality of third tubular elements 7, each nested within a respective one of the second tubular elements 5, whereby the nested ones of the second and third tubular elements 5, 7 provide nested tubular arrangements 11a-f.

In this embodiment the tubular elements 1, 5, 7 are circular in section, but could have other tubular shapes, for example, substantially square, rectangular, elliptical or oval.

In this embodiment the tubular elements 1, 5, 7 each have the same sectional shape, but the one or more of the tubular elements 1, 5, 7 could have different sectional shape.

In this embodiment the tubular elements 1, 5, 7 are circular and have complete rotational symmetry, but in other embodiments could be radially-elongate structures, which may exhibit reflectional symmetry about a single plane or about two orthogonal planes.

In this embodiment the tubular elements 1, 5, 7 are formed of glass, here silica.

In this embodiment the second tubular elements 5 are attached to the first tubular element 1 only at a single location on the cladding surface 3.

In this embodiment the second tubular elements 5 are arranged in non-touching relation and the adjacent second tubular elements 5 have a spacing d therebetween.

In this embodiment the spacing d of the adjacent second tubular elements 5 and the wall thickness t of the second tubular elements 5 have a ratio d/t greater than about 0.5, optionally greater than about 0.8, optionally greater than about 1, and optionally greater than about 2, and less than about 12, optionally less than about 10, optionally less than about 8, and optionally less than about 6.

In this embodiment the third tubular elements 7 are attached to the respective second tubular elements 5 at the locations at which the second tubular elements 5 are attached to the cladding surface 3.

In this embodiment the second and third tubular elements 5, 7 have the same or substantially the same wall thickness t.

In this embodiment the difference in diameter z between the second and third tubular elements 5, 7 is such that the ratio z/R of the diametral difference z and the core radius R is between about 0.3 and about 1.0, optionally between about 0.35 and about 0.95, which provides an optimum regime for lowest fundamental mode loss.

The present inventors have surprisingly determined that with an arrangement of nested anti-resonant elements 5, 7, and by providing the second tubular elements 5 to be in non-touching relation, and more particularly with a defined relationship between the spacing d of the adjacent second tubular elements 5 and the wall thickness t of the second tubular elements 5, a fiber is achieved which has a very significantly reduced loss as compared to existing fibers.

Figure 2:
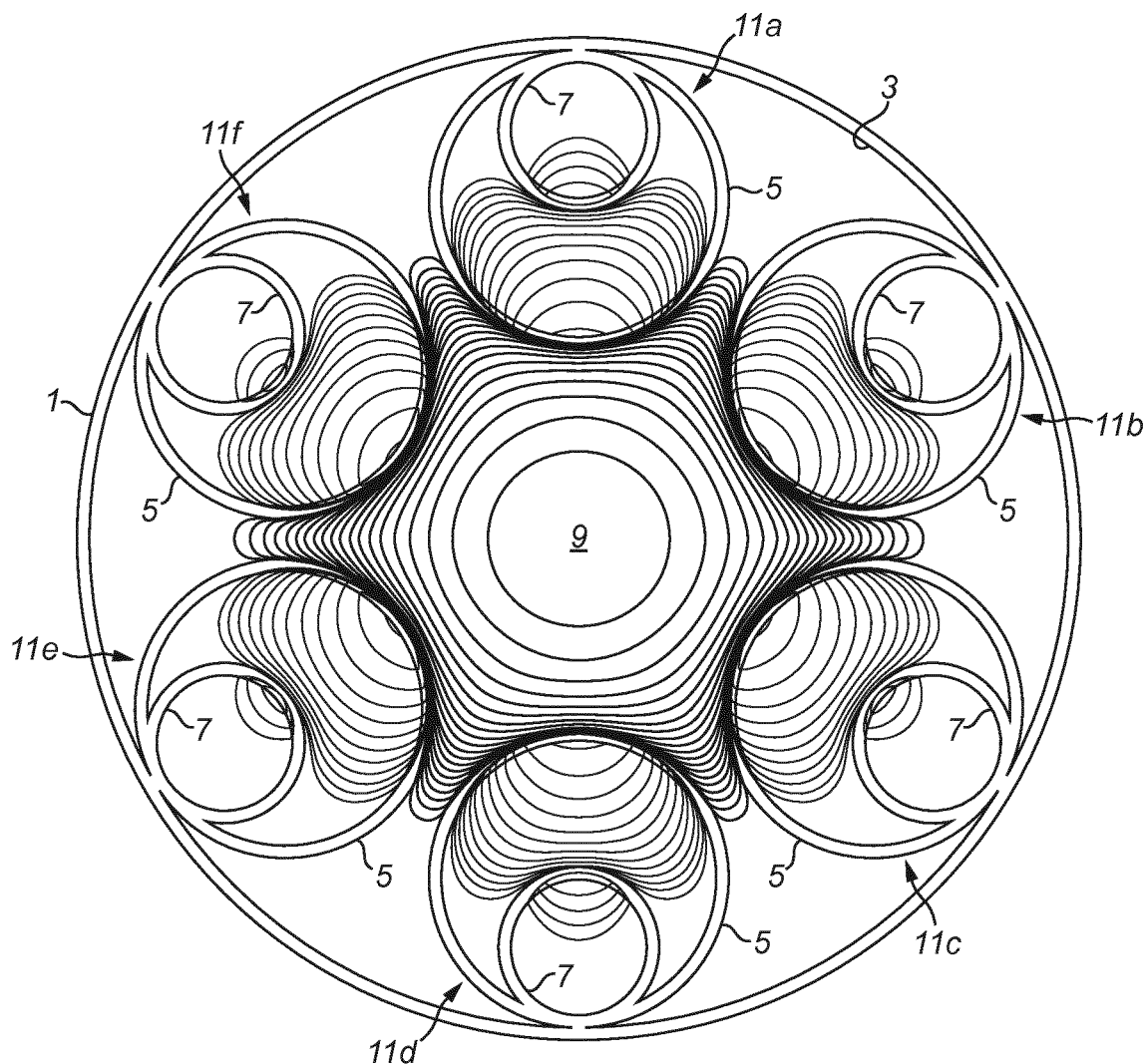
FIG. 2 illustrates contour plots of the intensity of the fundamental air-guided mode in accordance with a fiber of FIG. 1.

The fiber of the present invention provides a node-less arrangement of anti-resonant struts at the core 9 which confine light with a broad bandwidth, and the third tubular elements 7 further provide an additional boundary layer that acts coherently in effect as a Bragg mirror, which dramatically decreases the confinement loss of the fiber. The effect of the node-less arrangement and the nested third tubular elements 7 is clearly illustrated in FIG. 2, which includes 3 dB contour plots of the intensity of the fundamental air guided mode. With this arrangement, all of the inner boundaries in the fiber operate in anti-resonance, and the only nodes in the fiber are located at the boundary with the outer cladding element 1, where the field is typically 60-80 dB lower than at the core 9.

Figure 3:
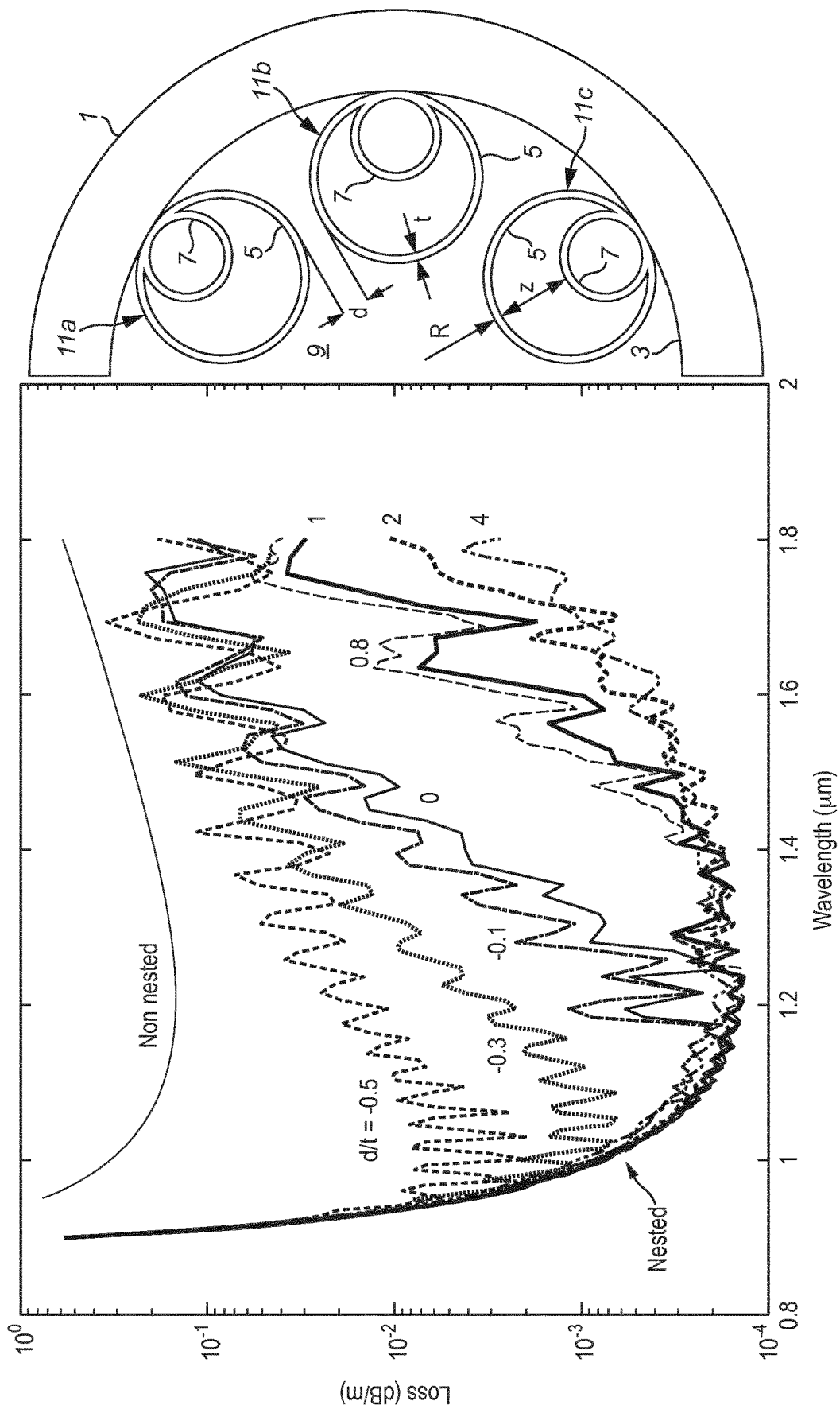
FIG. 3 illustrates plots of loss associated with different arrangements of nested tubular elements for comparative fibers and fibers in accordance with FIG. 1, having overlapping, just touching (zero spacing) and spaced configurations, with the ratios d/t of −0.5, −0.3, −0.1, 0, 0.8, 1, 2 and 4, as a function of wavelength.

FIG. 3 illustrates plots of loss associated with different arrangements of nested tubular elements 5, 7 having overlapping, just touching (zero spacing) and spaced configurations, with the ratios d/t of −0.5, −0.3, −0.1, 0, 0.8, 1, 2 and 4 as a function of wavelength for a fiber having a core radius R of 15 μm and the second tubular elements 5 having a wall thickness t of 0.42 μm, and with the ratios z/R being 0.9. The negative ratios d/t represent arrangements where the second tubular elements 5 are in overlapping relation. As will be seen from FIG. 2, fibers with an optimized ratio d/t exhibit markedly decreased loss over a very wide bandwidth range, especially over a range of wavelengths from about 1.2 μm to about 1.8 μm.

Figure 4:
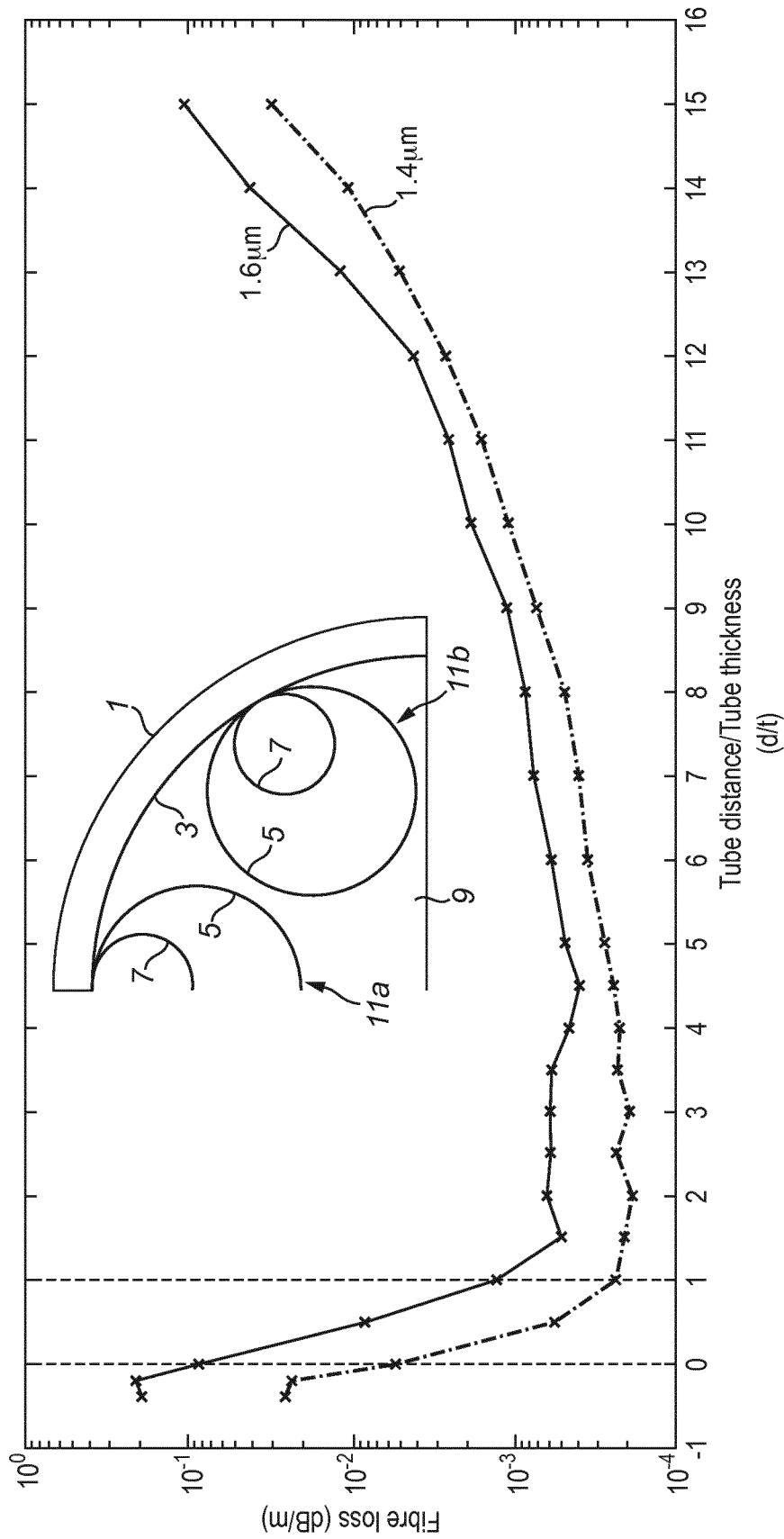
FIG. 4 represents loss as a function of the ratio d/t for two embodied wavelengths, namely, 1.4 µm and 1.6 µm, for comparative fibers and fibers in accordance with FIG. 1.

FIG. 4 represents loss as a function of the ratio d/t for two embodied wavelengths, namely, 1.4 μm and 1.6 μm, for a fiber having a core radius R of 15 μm, the second tubular elements 5 having a wall thickness t of 0.42 μm, and with the ratio z/R being 0.9. These plots clearly illustrate the significant improvement in loss when utilizing the nested tubular elements 5, 7 and where the ratio d/t has a defined range.

Figure 5:
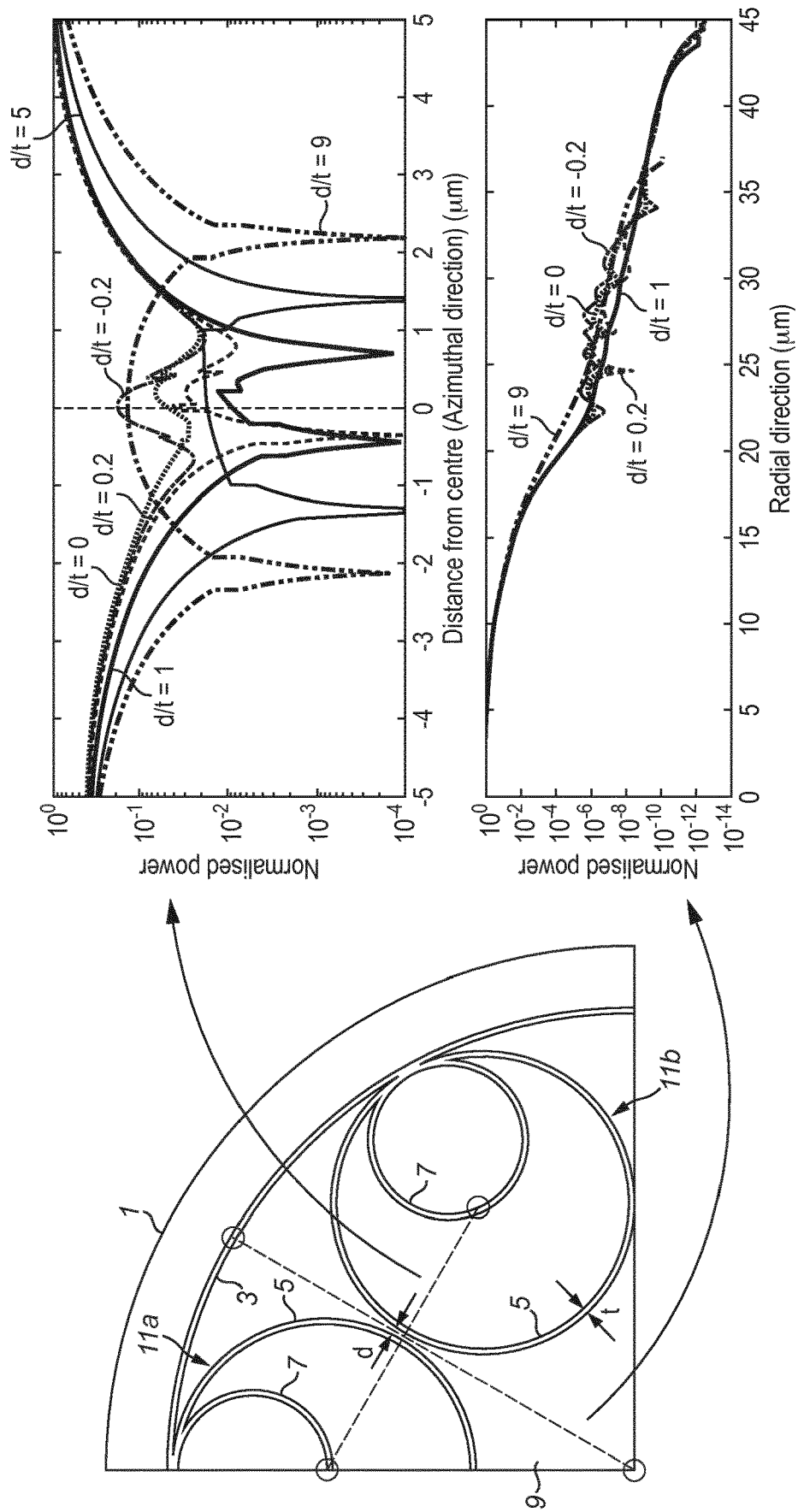
FIG. 5 illustrates field intensities in the azimuthal and radial directions at an intersection between adjacent second tubular elements in accordance with a fiber of FIG. 1.

As will be observed, loss increases markedly when the second tubular elements 5 are touching or the ratio d/t approaches zero. FIG. 5 illustrates the field intensities in the azimuthal and radial directions at an intersection between adjacent second tubular elements 5. When the second tubular elements 5 are touching (d/t≤0), the field is perturbed, but the perturbation in the azimuthal direction does not match the perturbation in the radial direction, owing to the presence of a thicker waveguide, causing the waveguides to be ineffective in anti-resonance. Further, when the second tubular elements 5 are spaced, but the spacing is small in relation to the wall thickness t, the field between the second tubular elements 5 is locally enhanced due to the discontinuity of the normal electric field component. And, when the ratio d/t becomes too large, the nested tubular elements 5, 7 are too far apart to act effectively as waveguides and prevent leakage. It is only in the particular condition of a nested arrangement of the tubular elements 5, 7, and with a selected ratio d/t, that the nested tubular elements 5, 7 provide waveguides which are sufficient for anti-resonance to expel the field effectively from the inter-tube channel.

Figure 6:
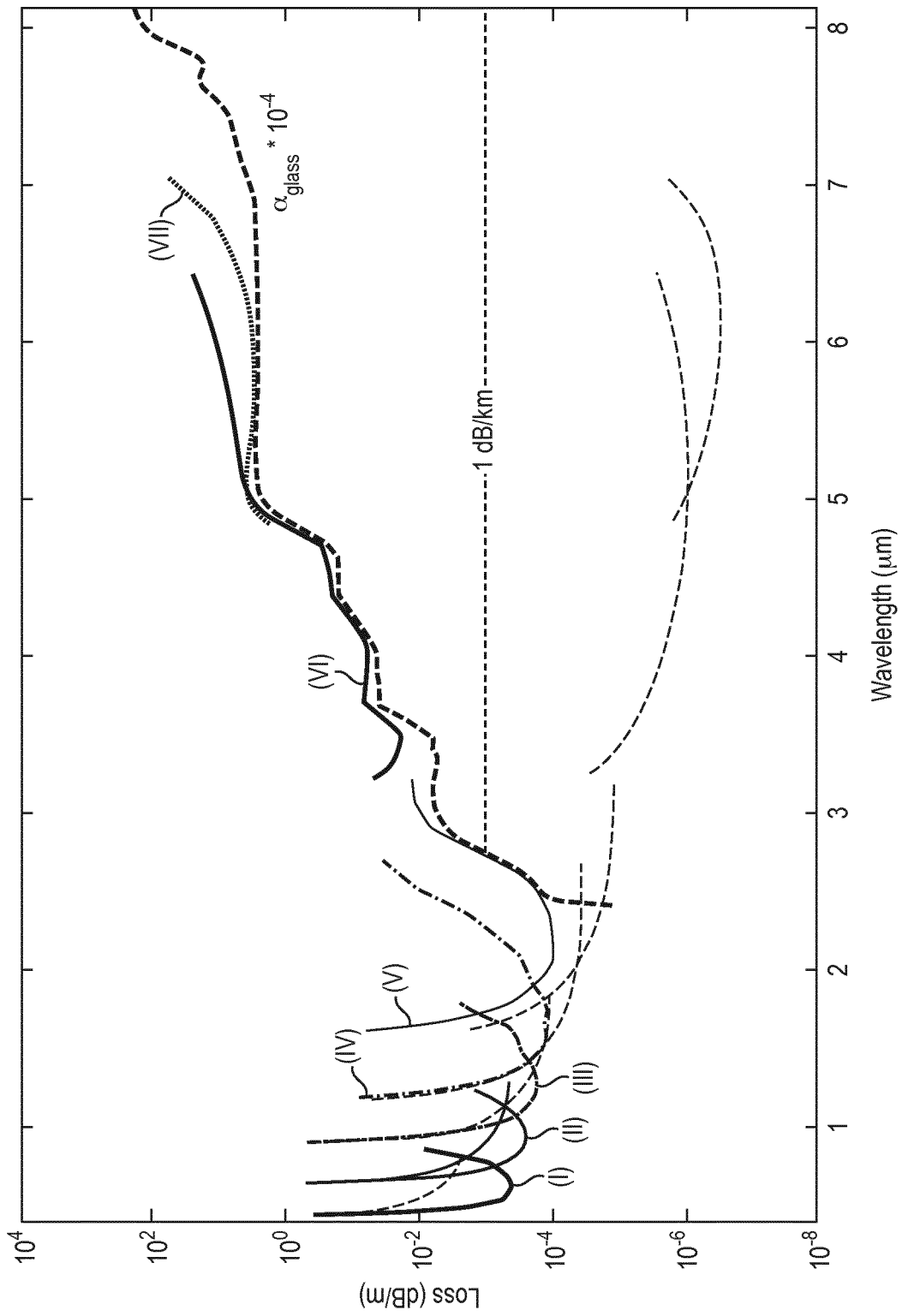
FIG. 6 illustrates loss as function of wavelength for fibers in accordance with FIG. 1.

FIG. 6 illustrates loss as function of wavelength for seven fibers having respectively (I) a core radius R of 7 μm and the second tubular elements 5 having a wall thickness of 0.2 μm, (II) a core radius R of 11 μm and the second tubular elements 5 having a wall thickness of 0.3 μm, (III) a core radius R of 15 μm and the second tubular elements 5 having a wall thickness of 0.42 μm, (IV) a core radius R of 20 μm and the second tubular elements 5 having a wall thickness of 0.55 μm, (V) a core radius R of 27 μm and the second tubular elements 5 having a wall thickness of 0.6 μm, (VI) a core radius R of 54 μm and the second tubular elements 5 having a wall thickness of 1 μm, and (VII) a core radius R of 80 μm and the second tubular elements 5 having a wall thickness of 2.25 µm, all having the ratio z/R of 0.9. The solid lines indicate confinement loss and material absorption loss, which dominate for most fibers at wavelengths of 2 µm and longer, while the dashed lines indicate scattering loss, which is only relevant for fibers guiding at short wavelengths.

As will be observed, loss of around 1 dB/km or lower is predicted from UV, through visible, up to wavelengths of about 2.5 µm. A loss of less than 1 dB/m is possible up to wavelengths of about 5 µm, while fibers having a loss of about 2 dB/m to about 4 dB/m can be utilized at wavelengths at up to 7 µm. In contrast, PBGFs have a minimum transmission loss window centered in the near IR, between 1.5 µm and 2 µm.

In addition, in the fibers of the present invention, the fraction of optical power guided in the glass is extremely low (between $10^{-5}$ and $10^{-4}$), which allows light transmission at wavelengths where the glass is strongly opaque. For example, in the case of silica glass, fibers having loss of a few dB/m could guide at wavelengths in the region of about 5 µm to about 7 µm, where the glass loss is 60,000 dB/m. The light guiding mechanism of the present invention also enables the use of glasses with a higher refractive index and longer IR multiphonon edges, hence enabling hollow fibers guiding at wavelengths of up to 10 µm, and longer to 12 µm, even possibly to 15 µm. Again, this contrasts with PBGFs where a high-index glass severely compromises the performance to the point that no guiding PBGF made of a glass different from silica has been reported to date.

Figure 7:
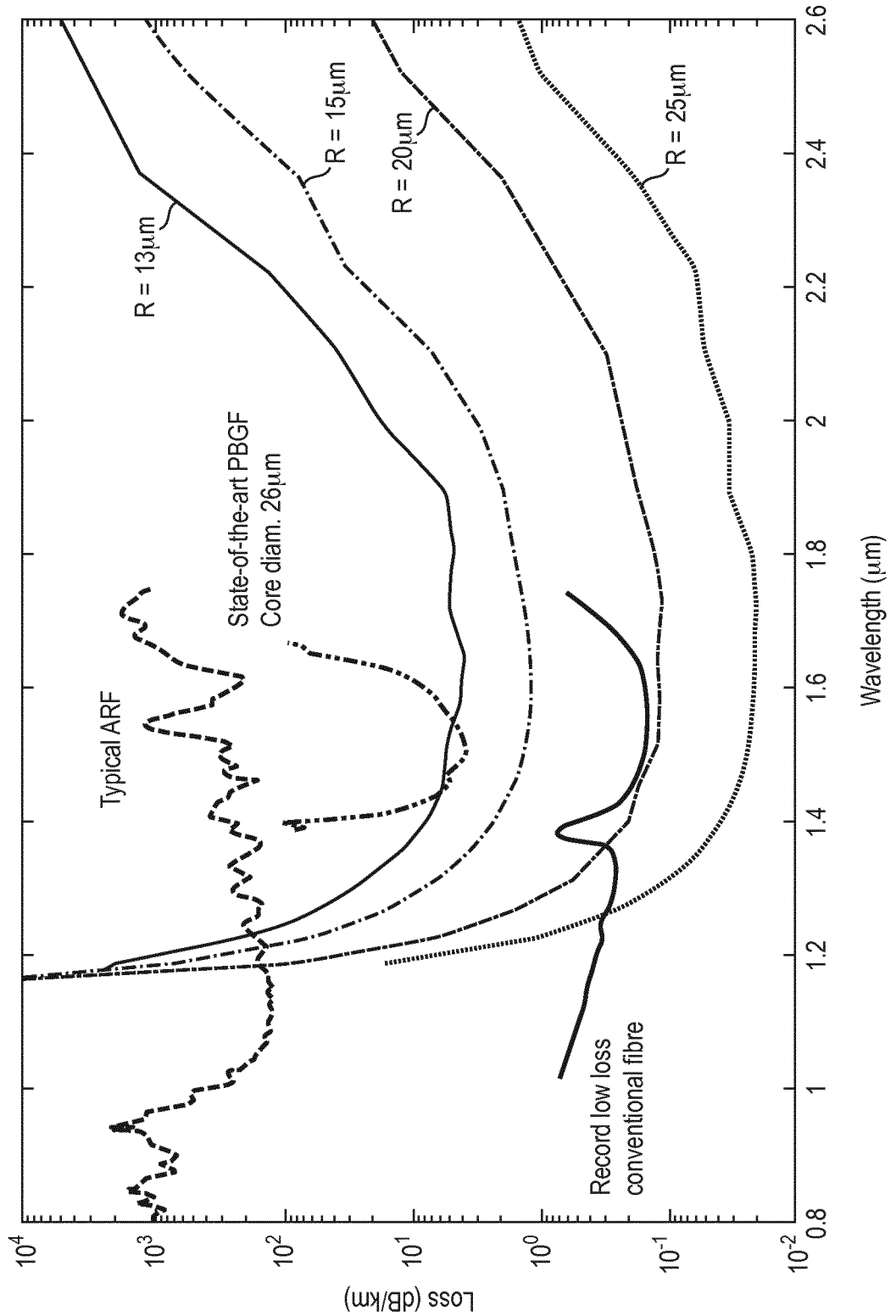
FIG. 7 illustrates loss as function of wavelength for straight fibers in accordance with FIG. 1, having core radiuses R of 13 µm, 15 µm, 20 µm and 25 µm.

FIG. 7 illustrates loss as function of wavelength for straight fibers having core radiuses R of 13 µm, 15 µm, 20 µm and 25 µm, each having the ratio d/t of 5, the second tubular elements 5 having a wall thickness t of 0.55 µm, and with the ratio z/R of 0.9, as compared to a typical ARF (Poletti et al, "Optimising the Performances of Hollow Antiresonant Fibres," European Conference on Optical Communication (ECOC) 2011, paper Mo.2.LeCervin.2), a state of the art PBGF (Poletti et al, Nature Photonics, Vol 7, pages 279 to 284, 2013) and a conventional fiber with record low loss (Nagayama et al "Ultra-low-loss (0.1484 dB/km) pure silica core fibre and extension of transmission distance", Electronics Letters, Vol 38, pages 1168 and 1169, 2002).

As will be observed, the loss decreases with an increase in the core radius R, and this decrease in the loss has been modelled to scale to $\lambda^7/R^8$, where $\lambda$ is the wavelength. At a core radius R of 13 µm, the fiber of the present invention has a minimum loss equivalent to a state of the art PBGF and is operational over a much broader bandwidth. At a core radius R of 20 µm, the fiber of the present invention has a minimum loss equivalent to a conventional fiber which currently exhibits a record low loss, and again is operational over a broader bandwidth, especially to longer wavelengths.

In this embodiment the fiber includes six nested tubular elements 5, 7. In other embodiments the fiber could include three, four or five nested tubular elements 5, 7.

This arrangement is contrary to the adopted understanding in the art (Vincetti et al, Optics Express, Vol 18, pages 23133 to 23146, 2010) that seven or eight tubular elements or waveguides are required for optimal performance, especially in the extinction of higher-order modes.

In addition to the benefits associated with loss and bandwidth, the fiber of the present invention is also effectively single moded.

Figure 8:
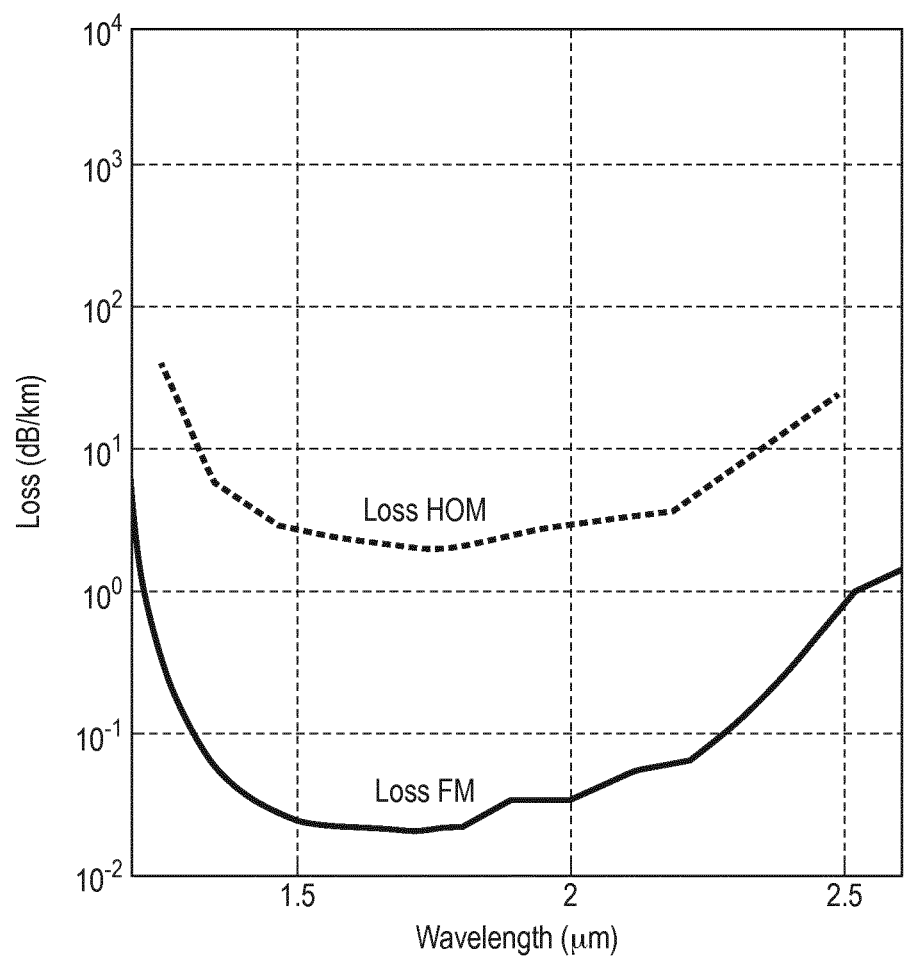
FIG. 8 illustrates losses of the fundamental mode (FM) and the first high-order mode (HOM) for a fiber in accordance with FIG. 1.

FIG. 8 illustrates the losses of the fundamental mode (FM) and the first high-order mode (HOM) for a fiber having a core radius R of 25 µm, the ratio d/t of 5, the second tubular elements 5 having a wall thickness t of 0.55 µm, and with the ratio z/R of 0.9. The two orders of magnitude in differential loss indicate an effective single-mode behaviour over sufficiently long fibers. This single modedness presents clear advantages for data transmission, in avoiding data distortion from intermodal couplings and contrasts with PBGFs, which, despite having been already successfully used for demonstration of high data capacity transmission, are inherently multi-moded and have a relatively-low differential mode loss of only a factor of approximately 2, which renders use in mode-division multiplexed transmissions problematic.

Figure 9:
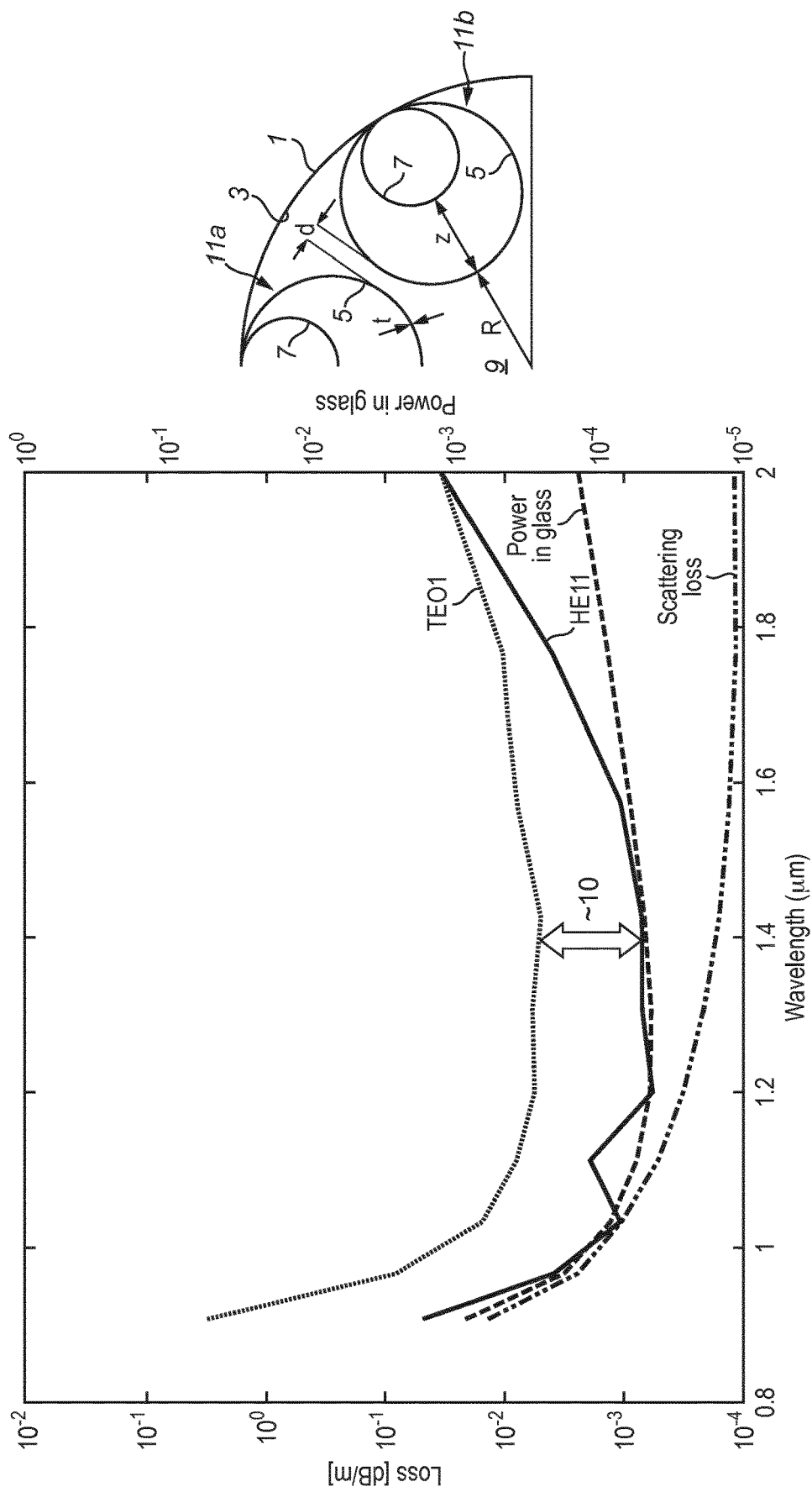
FIG. 9 illustrates plots of loss for the fundamental mode HE11 and the lowest-loss higher-order mode TE01 for one fiber in accordance with FIG. 1.

FIG. 9 illustrates a plot of loss for the fundamental mode HE11 and the lowest-loss higher-order mode TE01 for a fiber having a core radius R of 15 um, nested tubular elements 5, 7 with a wall thickness t of 0.42 µm, the ratio d/t of 5, and the ratio z/R of 0.8.

As will be observed, the differential loss for the fundamental mode HE11 and the lowest-loss higher-order mode TE01 is approximately an order of magnitude, enabling single-mode operation. In addition, it will be noted that the fraction of optical power guided in the glass is very low (between $10^{-4}$ and $10^{-3}$).

Figure 10:
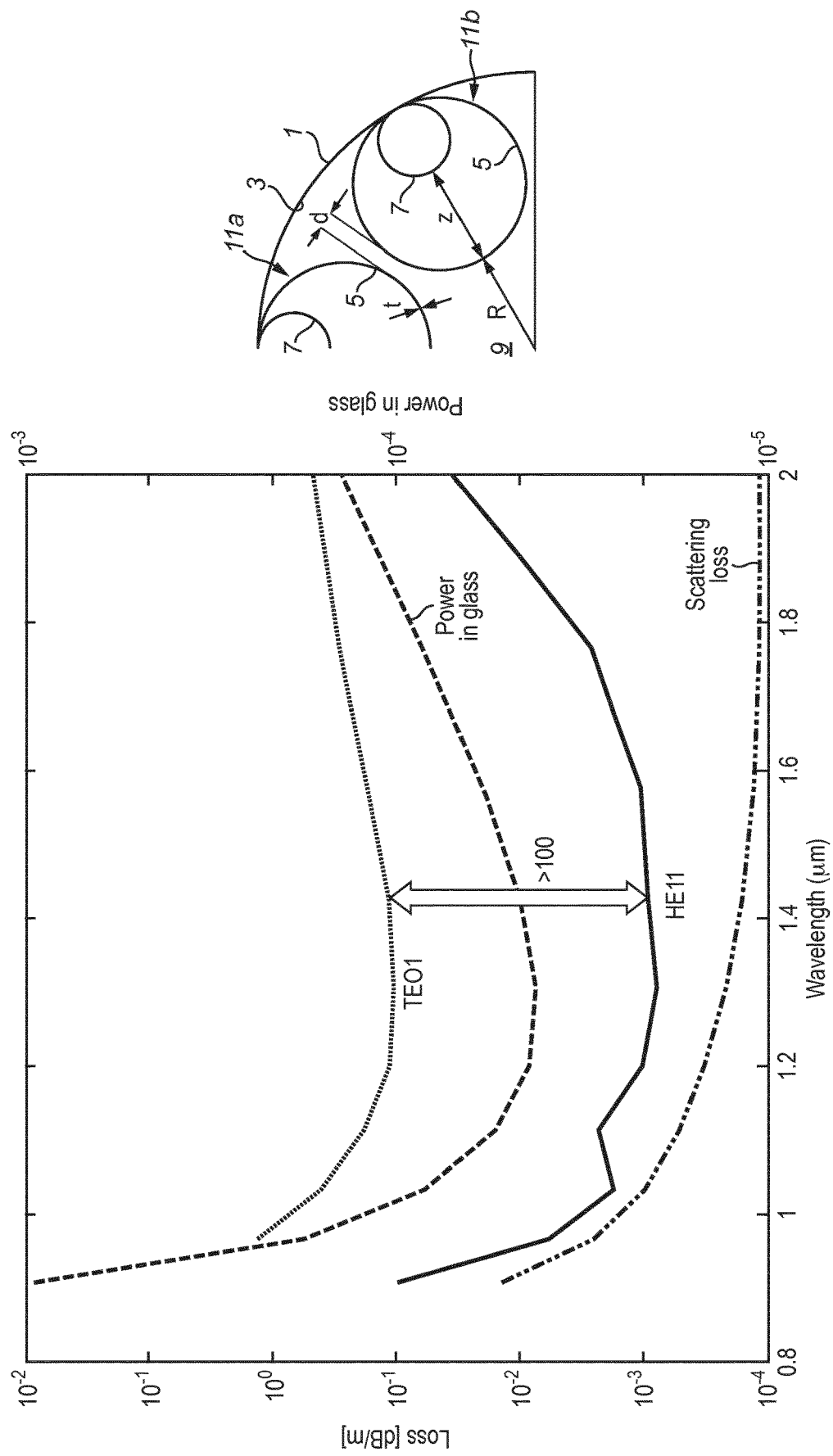
FIG. 10 illustrates plots of loss for the fundamental mode HE11 and the lowest-loss higher-order mode TE01 for another fiber in accordance with FIG. 1.

FIG. 10 illustrates a plot of loss for the fundamental mode HE11 and the lowest-loss higher-order mode TE01 for a fiber having a core radius R of 15 µm, nested tubular elements 5, 7 with a wall thickness t of 0.42 µm, the ratio d/t of 5, and the ratio z/R of 1.

As will be observed, the differential loss for the fundamental mode HE11 and the lowest-loss higher-order mode TE01 is approximately two orders of magnitude, further enabling single-mode operation. By increasing the ratio z/R, the differential loss is significantly increased by enhancing the resonant coupling at the nested tubular elements 5, 7. In addition, it will again be noted that the fraction of optical power guided in the glass is very low (between $10^{-4}$ and $10^{-3}$)

Figure 11:
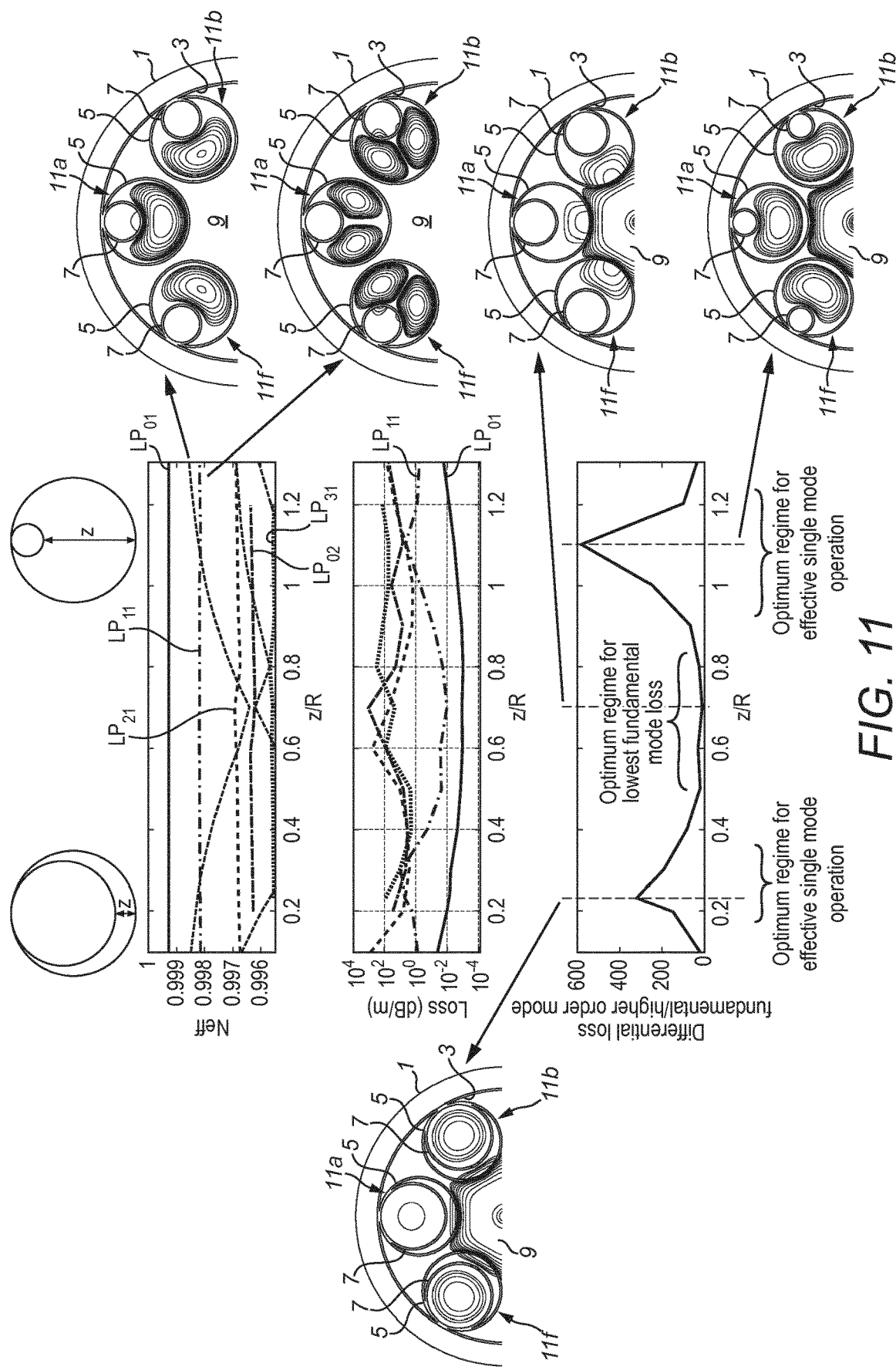
FIG. 11 illustrates plots of differential loss for the fundamental mode HE11 and the lowest-loss higher-order mode TE01 as a function of the ratio z/R for fibers in accordance with FIG. 1.

FIG. 11 illustrates a plot of differential loss for the fundamental mode HE11 and the lowest-loss higher-order mode TE01 as a function of the ratio z/R for a fiber having a core radius R of 15 um, nested tubular elements 5, 7 with a wall thickness t of 0.55 µm, the ratio d/t of 5.

As will be seen, in this embodiment the fiber provides two effective single-mode regimes which provide improved effective single-mode operation, these being for the ratio z/R between about 0.05 and about 0.4, optionally between about 0.1 and 0.3, more optionally between about 0.2 and about 0.3, in which the higher-order mode LP01 in the core 9 is matched to a mode LP11 residing inside the third tubular elements 7, and for the ratio z/R between about 0.8 and about 1.2, optionally between about 0.9 and 1.2, more optionally between about 1.0 and about 1.2, in which the higher-order mode LP01 in the core 9 is matched to a mode LP11 guided between the second and third tubular elements 5, 7. In these arrangements, the nested elements 5, 7 support a mode having an effective index (neff) which is well matched, optionally having a differential in the effective mode (Δneff) of less than about 0.001, to that of the higher-order mode LP01 in the core 9, such as to cause coupling to the supported mode due to perturbations and consequently increased the loss associated with the supported mode, and thereby increase the differential loss.

As will also be seen, in this embodiment the fiber provides for lowest fundamental loss for the ratio z/R between about 0.35 and about 0.9.

Figure 12:
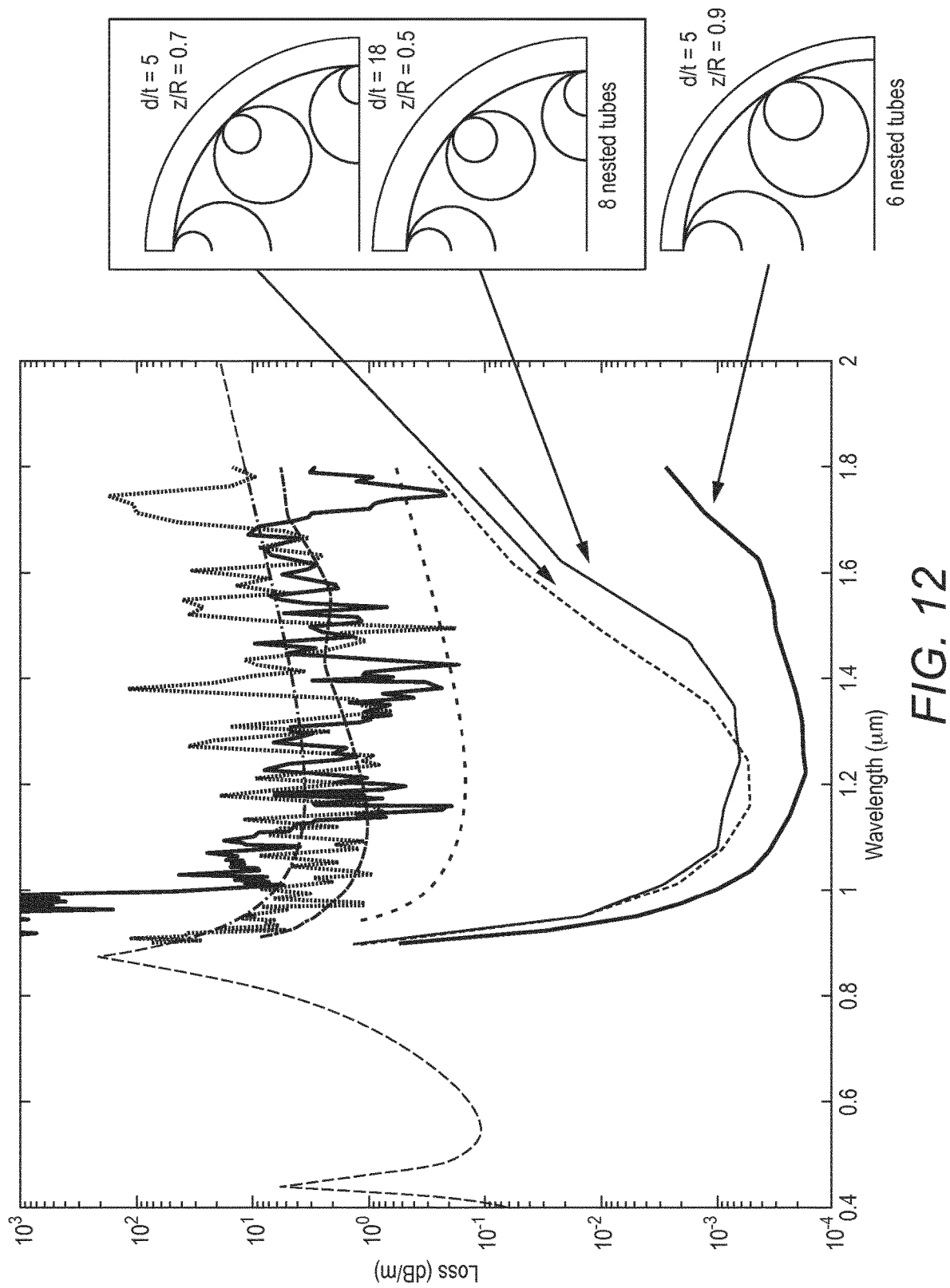
FIG. 12 illustrates plots of loss as a function of wavelength for fibers in accordance with FIG. 1, having six and eight nested tubular elements.

FIG. 12 represents loss as a function of wavelength for a first fiber having six nested tubular elements 5, 7 with a core radius R of 15 μm, the tubular elements 5, 7 having a wall thickness t of 0.42 μm, the ratio d/t of 5 and the ratio z/R of 0.9, a second fiber having eight nested tubular elements 5, 7 with the same core radius R of 15 μm, the tubular elements 5, 7 having a wall thickness t of 0.42 μm, the ratio d/t of 5 and the ratio z/R of 0.7, and a third fiber having eight nested tubular elements 5, 7 with a core radius R of 15 μm, the tubular elements 5, 7 having a wall thickness t of 0.42 μm, the ratio d/t of 18 and the ratio z/R of 0.5.

As will be observed, there is a significant loss advantage in the fiber having six nested tubular elements 5, 7.

Figure 13:
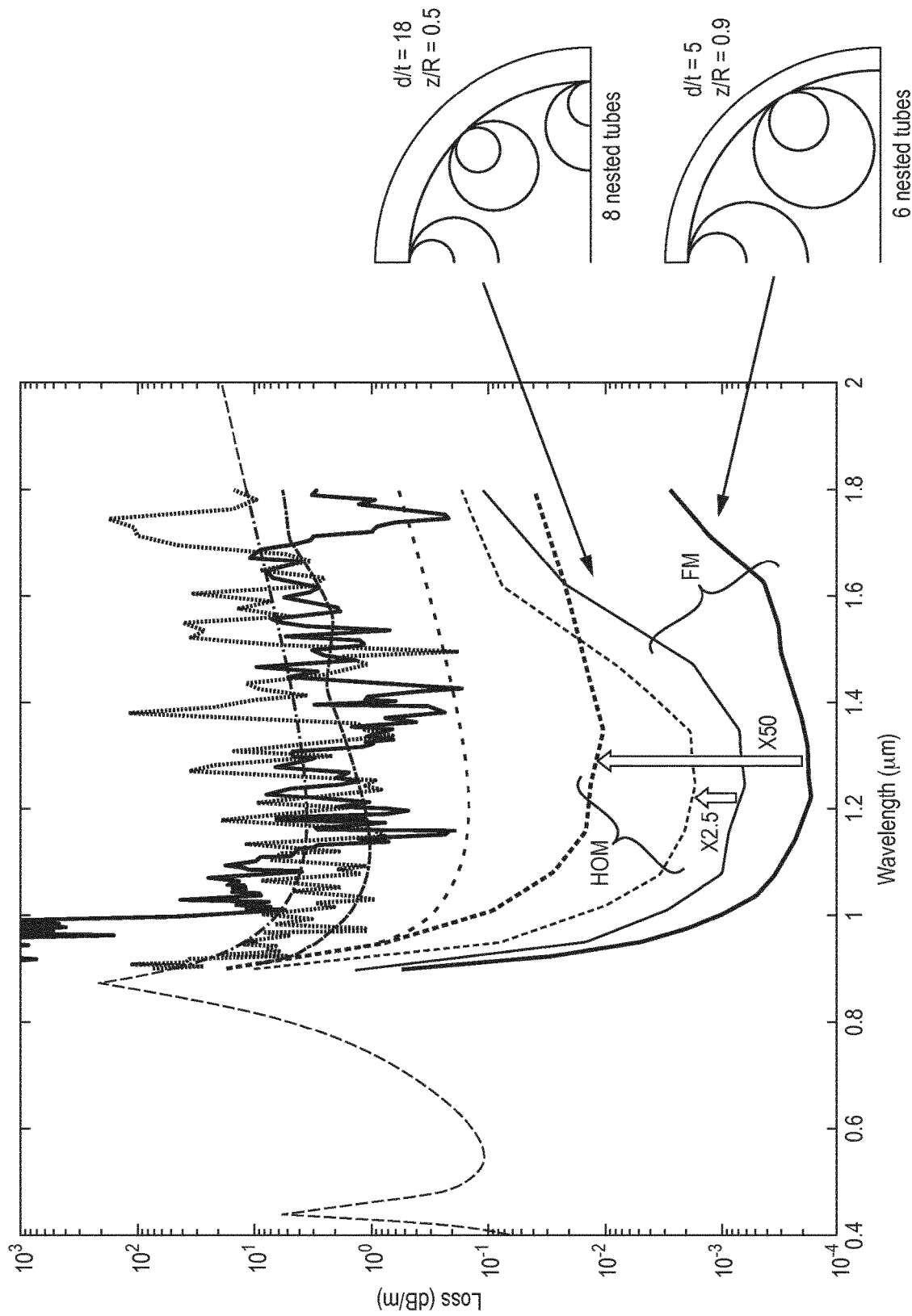
FIG. 13 illustrates plots of loss for the fundamental mode (FM) and the first higher-order mode (HOM) for fibers in accordance with FIG. 1, having six and eight nested tubular elements.

FIG. 13 illustrates a plot of loss for the fundamental mode FM and the first higher-order mode HOM for a fiber having six nested tubular elements 5, 7 with a core radius R of 15 μm, the tubular elements 5, 7 having a wall thickness t of 0.42 μm, the ratio d/t of 5 and the ratio z/R of 0.9, and a fiber having eight nested tubular elements 5, 7 with a core radius R of 15 μm, the tubular elements 5, 7 having a wall thickness t of 0.42 μm, the ratio d/t of 18 and the ratio z/R of 0.5.

As will be observed, the fiber having eight nested tubular elements 5, 7 has a differential loss between the fundamental mode FM and the first higher-order mode HOM of only 2.5, whereas the fiber having six nested tubular elements 5, 7 has a differential loss between the fundamental mode FM and the first higher-order mode HOM of 50, enabling enhanced modality control and effectively single-mode guidance by propagating modes over a sufficiently long distance inside the fiber.

In addition, the fiber of the present invention allows for granular control of the mode field diameter (MFD) for any given wavelength, enabling the fabrication of a hollow-core fiber with an MFD which is matched to that of a solid core counterpart. In contrast, in PBGFs, for a given operational wavelength, only a set of fixed core sizes can be achieved, by removing an integer number of capillaries to form the central core.

Figure 14:
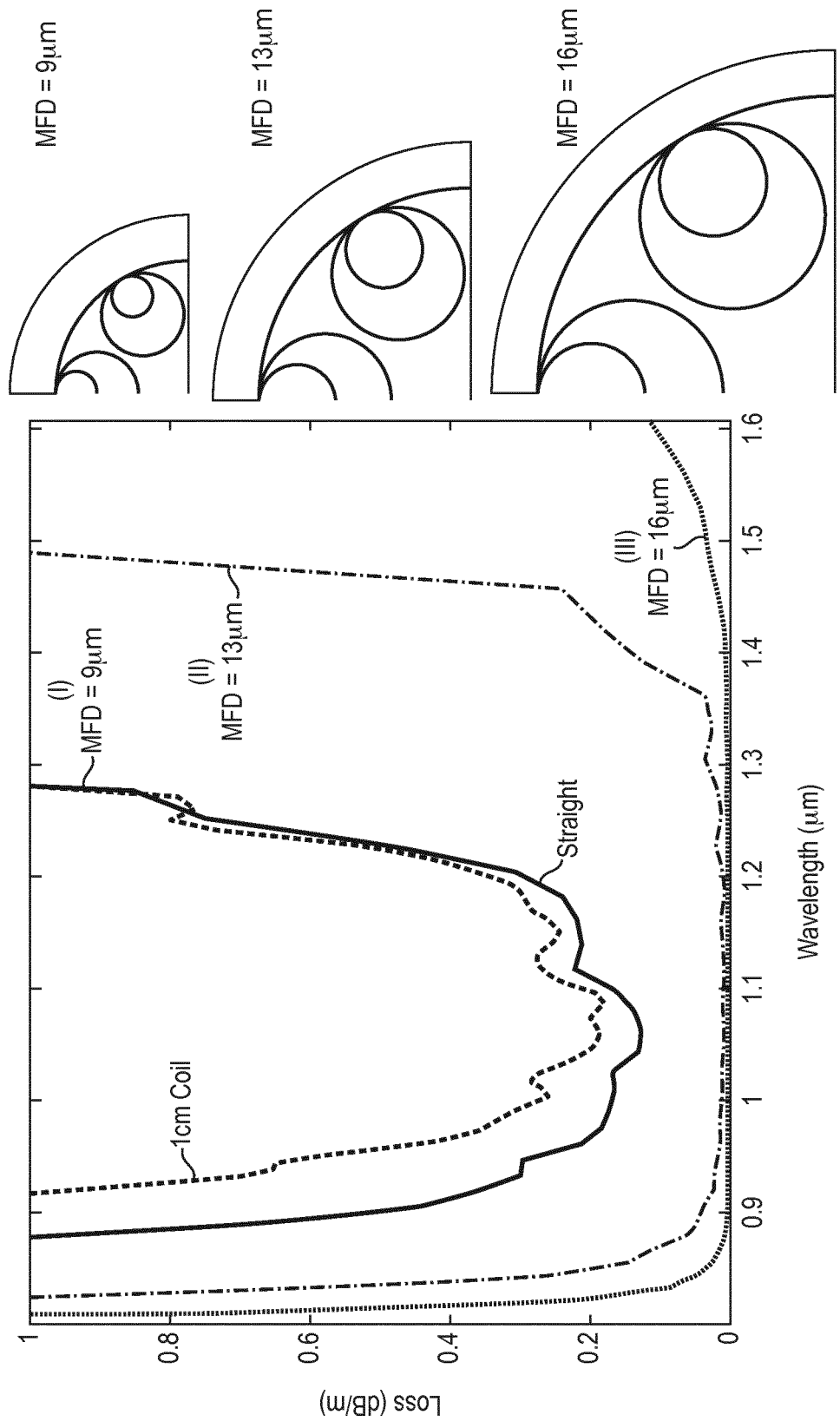
FIG. 14 illustrates plots of loss as a function of wavelength for fibers in accordance with FIG. 1, having MFDs of (I) 9 µm, (II) 13 µm and (III) 16 µm.

FIG. 14 illustrates three fibers having MFDs of (I) 9 μm, (II) 13 μm and (III) 16 μm, operating at an operational wavelength of 1.06 μm, typical of Ytterbium-doped fiber lasers. All of the fibers have the six nested tubular elements 5, 7 having a wall thickness t of 0.375 μm, the ratio d/t of 5 and the ratio z/R of 0.7, and differ only in terms of the core radius R, with the first fiber (I) having a core radius R of 6 μm, the second fiber (II) having a core radius R of 8 μm, and the third fiber (III) having a core radius R of 10 μm.

As will be observed, even at the smallest MFD, in this embodiment the fiber has a sufficiently-low loss for a power-delivery application. For example, tailoring the MFD to that of a solid active/passive fiber from a fiber laser, such as an Yb fiber laser, would minimise coupling losses and favour direct splices, while the ultra-low non-linearity would ensure very high non-linear and damage thresholds, especially required in short pulse delivery applications.

Figure 15:
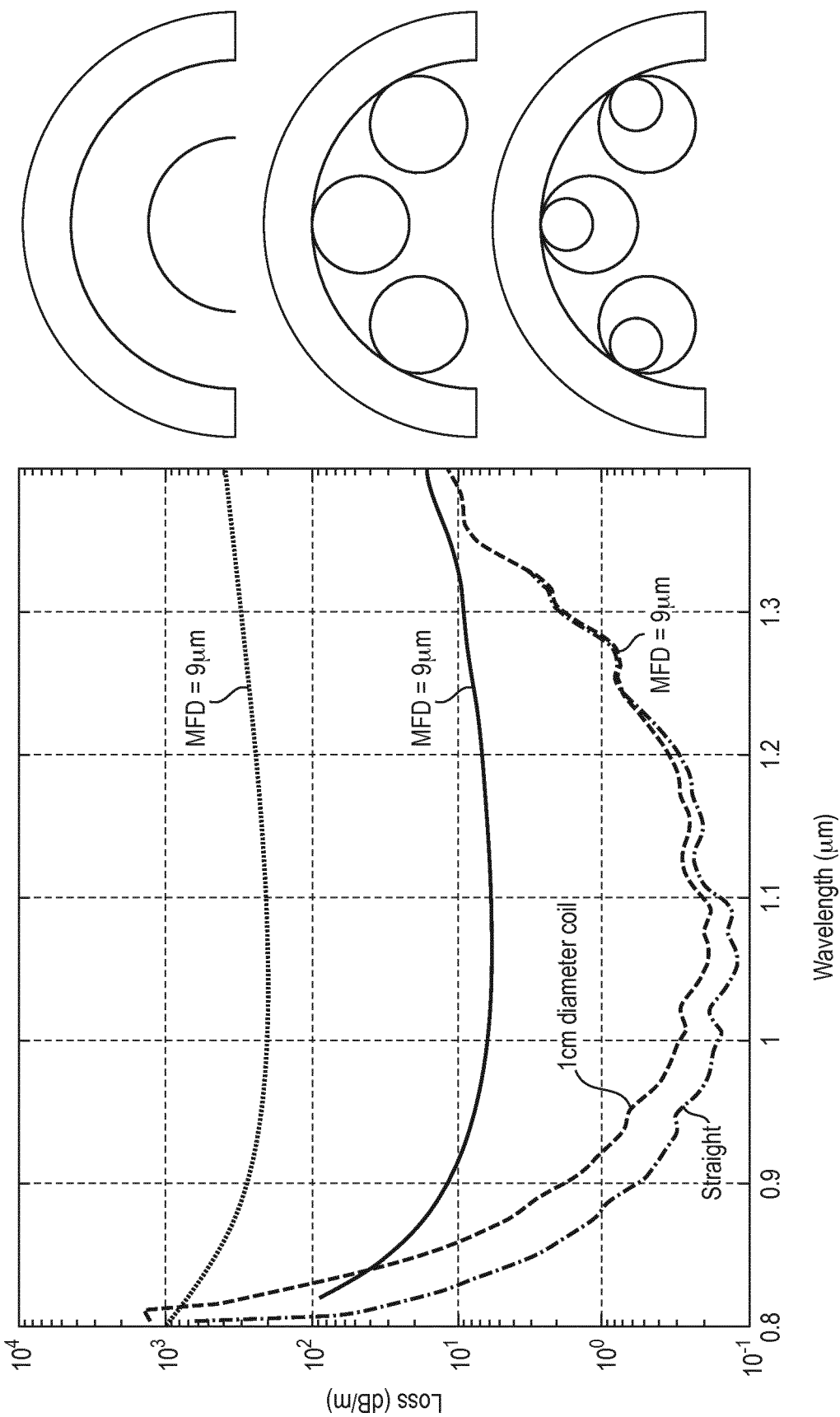
FIG. 15 illustrates plots of loss as a function of wavelength for comparative fibers and a fiber in accordance with FIG. 1, each having an MFD of 9 µm.

Furthermore, the fibers can be coiled tightly, and exhibit equivalent low loss values. As illustrated in FIG. 14, the total loss of the first MFD fiber (I) when coiled around a 1 cm diameter mandrel is comparable to that when straight. These loss characteristics can be compared to those of existing hollow-core designs having an MFD of 9 μm, and operating at a wavelength of 1.06 μm, which exhibit markedly-higher losses, as illustrated in FIG. 15.

Figure 16:
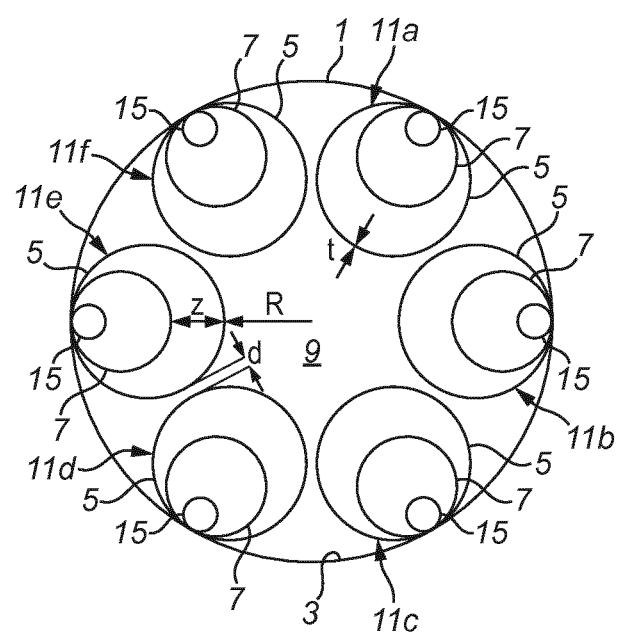
FIG. 16 illustrates a hollow-core anti-resonant fiber in accordance with a second embodiment of the present invention.

FIG. 16 illustrates a fiber in accordance with a second embodiment of the present invention.

The fiber of this embodiment is similar to the fiber of the first-described embodiment and differs in having fourth tubular elements 15 which are nested within respective ones of the third tubular elements 7.

In this embodiment the second, third and fourth tubular elements 5, 7, 15 have the same or substantially the same wall thickness t.

Figure 17:
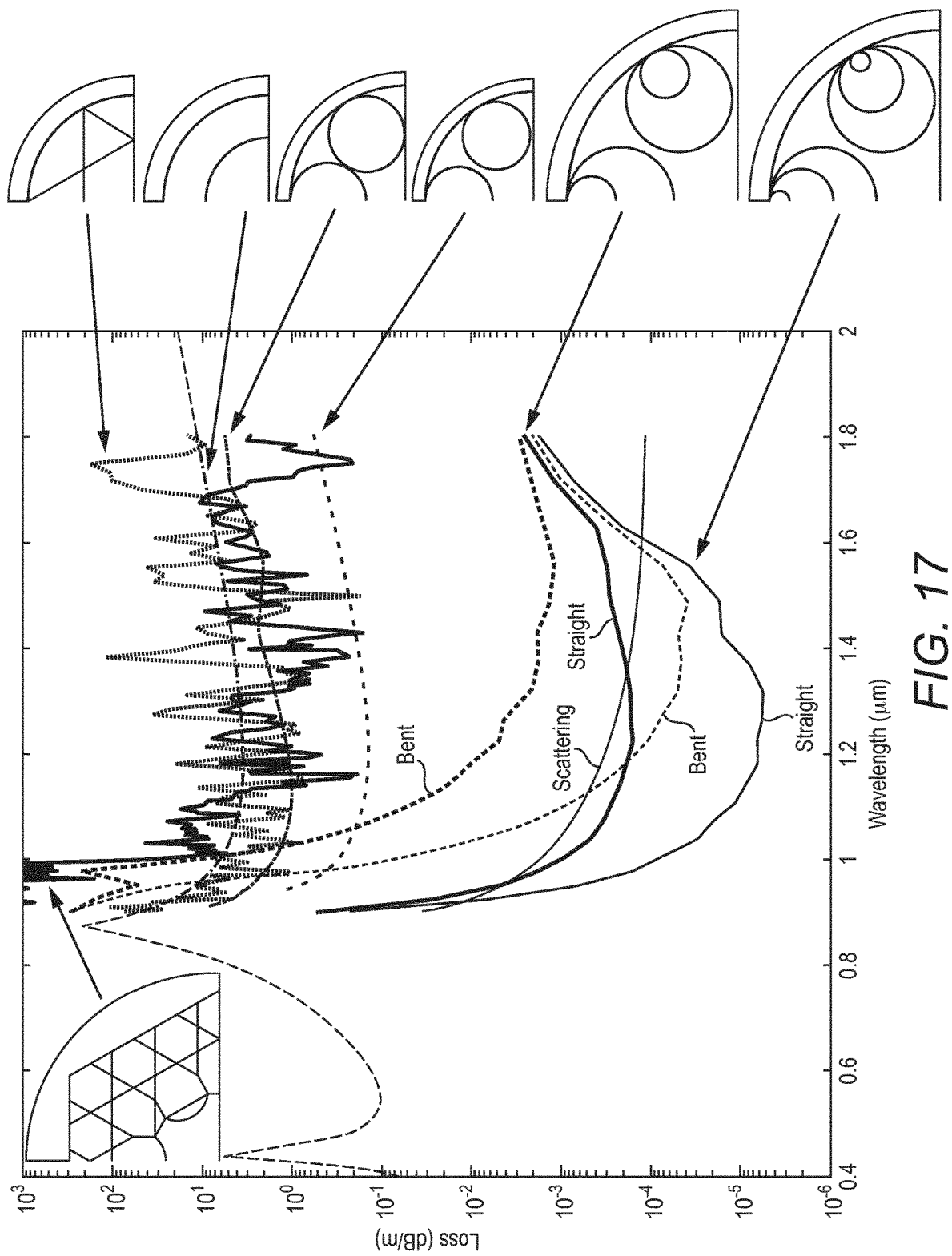
FIG. 17 illustrates plots of loss as a function of wavelength for fibers in accordance with FIGS. 1 and 16, both when straight (solid line) and when bent (dashed line) to a radius of 2.5 cm.

FIG. 17 illustrates plots of loss as a function of wavelength for the fibers of the first and second embodiments described above, both when straight (solid line) and when bent (dashed line), in this embodiment to a radius of 2.5 cm.

As will be observed, loss decreases markedly with the introduction of the additional tubular element 15 in the second-described embodiment, and furthermore, this second-described embodiment exhibits a significant reduction in differential loss when bent.

FIGS. 18 to 22 illustrate fibers in accordance with various further embodiments of the present invention.

Figure 18:
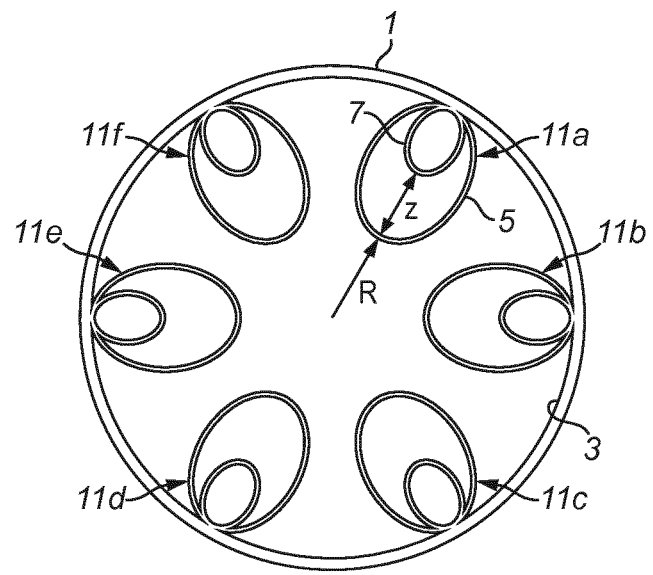
FIG. 18 illustrates a hollow-core anti-resonant fiber in accordance with a third embodiment of the present invention.

FIG. 18 is a modification of the first-described embodiment, and includes second and third tubular elements 5, 7 of different shape, in this embodiment an asymmetric shape, here elliptical or oval. In this embodiment the tubular elements 5, 7 have a longer dimension in the radial direction of the cladding element 1. In this embodiment the fiber has a z/R ratio of 1.

In an alternative embodiment the tubular elements 5, 7 could have different sectional profile. For example, the second tubular elements 5 could be radially elongated, such as elliptical or oval, and the third tubular elements 7 circular.

Figure 19:
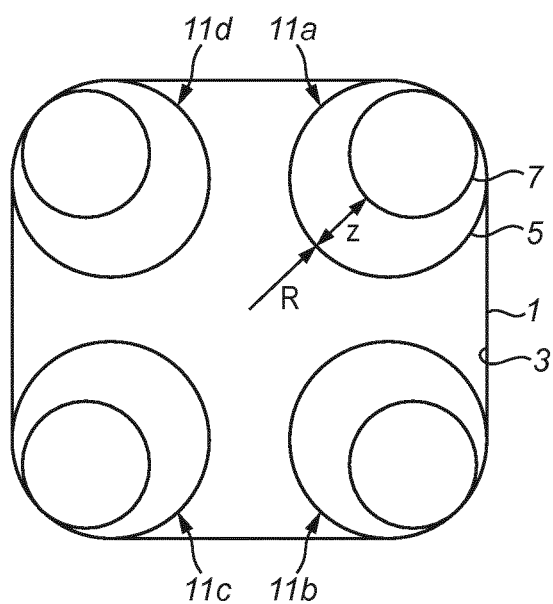
FIG. 19 illustrates a hollow-core anti-resonant fiber in accordance with a fourth embodiment of the present invention.

FIG. 19 is a further modification of the first-described embodiment, in which the cladding element 1 has a different tubular shape, in this embodiment substantially square, to the second and third tubular elements 5, 7, and include four nested tubular arrangements 11a-d.

Figure 20:
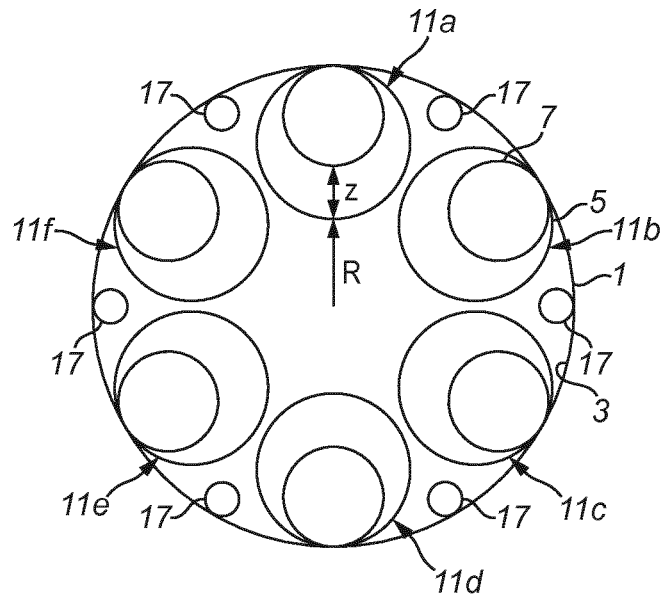
FIG. 20 illustrates a hollow-core anti-resonant fiber in accordance with a fifth embodiment of the present invention.

FIG. 20 is a yet further modification of the first-described embodiment, which includes additional tubular anti-resonant elements 17 intermediate respective ones of the nested tubular elements 5, 7.

Figure 21:
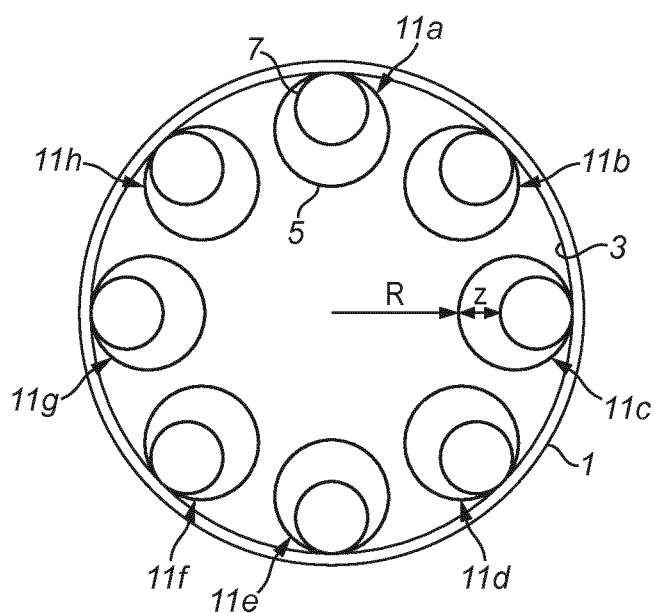
FIG. 21 illustrates a hollow-core anti-resonant fiber in accordance with a sixth embodiment of the present invention.

FIG. 21 is a still further modification of the first-described embodiment, and includes eight nested tubular arrangements 11a-h disposed in spaced relation at the cladding surface 3 of the cladding element 1.

Figure 22:
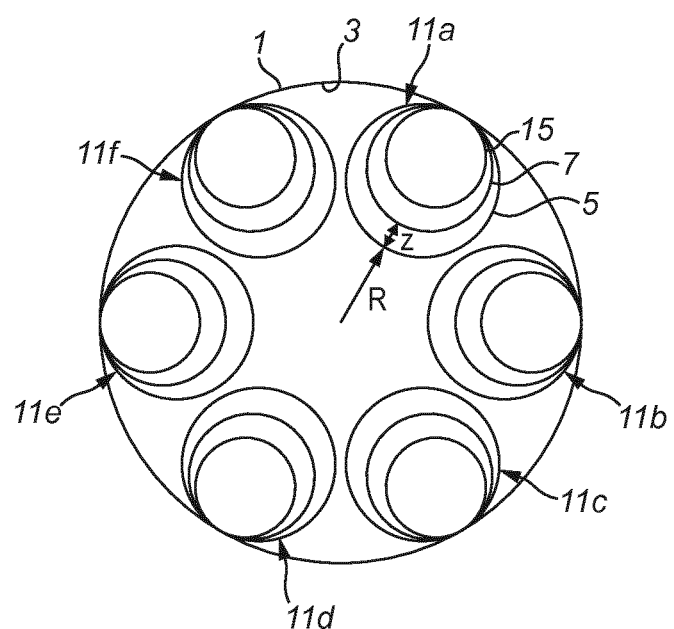
FIG. 22 illustrates a hollow-core anti-resonant fiber in accordance with a seventh embodiment of the present invention.

FIG. 22 is a modification of the second-described embodiment, and includes third and fourth tubular elements 7, 15 of greater diameter in relation to the second tubular elements 5. In this embodiment resonance occurs between the higher-order mode guided in the core 9 and the modes supported within the fourth, smallest elements 15, which consequentially creates high loss in the supported modes.

Figure 23:
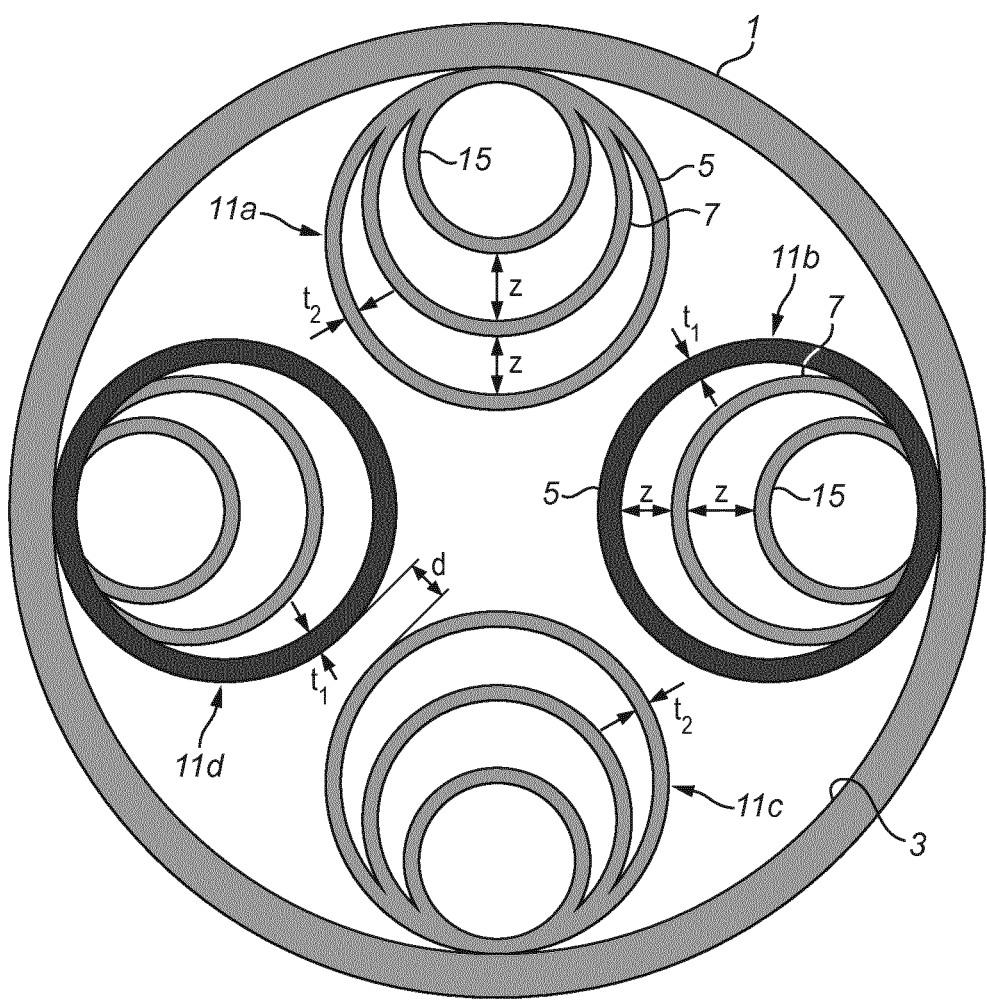
FIG. 23 illustrates a hollow-core anti-resonant fiber in accordance with an eighth embodiment of the present invention.

FIG. 23 illustrates a fiber in accordance with an eighth embodiment of the present invention.

The fiber of this embodiment is similar in structure to the fiber of the second-described embodiment and differs in having four nested tubular arrangements 11a-d, each comprising second, third and fourth tubular elements 5, 7, 15, which are arranged in orthogonal relation as a first pair of tubular arrangements 11a, c and a second pair of tubular arrangements 11b, d. In alternative embodiments the fiber could include a different number of nested tubular arrangements 11, for example, three, five, six, seven or eight nested tubular arrangements 11.

In this embodiment the outer tubular elements 5 of one, here the second pair of the nested tubular arrangements 11b, d have a wall thickness $t_1$ which is different to that of the wall thickness $t_2$ of the outer tubular elements 5 of the other, here the first pair of the nested tubular arrangements 11a, c, with the wall thickness $t_1$ of the outer tubular elements 5 of the one pair of the nested tubular arrangements 11b, d being such as to provide for operation at anti-resonance and the wall thickness $t_2$ of the outer tubular elements 5 of the other pair of the nested tubular arrangements 11a, c being such as to provide for operation at an edge of resonance.

As with the previously-described embodiments, the structure of this embodiment reduces the confinement loss (CL) through the provision of reflecting anti-resonance layers from the inner tubular elements 7, 15 of the nested tubular arrangements 11a-d and the elimination of glass nodes in the clad structure, but significantly, through the wall thickness $t_2$ of the outer tubular elements 5 of the one pair of the nested tubular arrangements 11b, d being different and providing for operation at an edge of resonance, introduces a strong phase bi-refringence (PB) for the orthogonal polarizations of the fundamental mode (OPFM), through introducing an effective index difference in the direction of the one pair of the nested tubular arrangements 11b, d.

Figure 24:
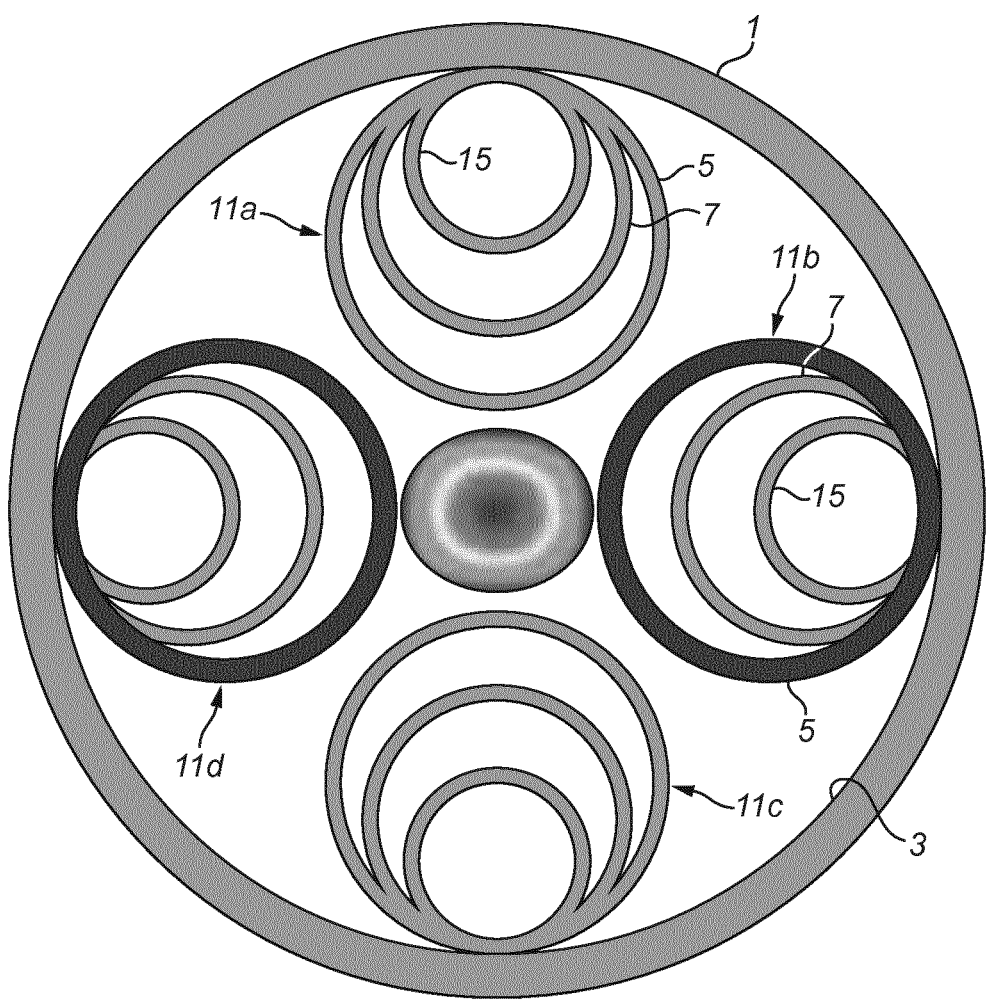
FIG. 24 represents the fundamental anti-crossing mode profile of the fiber of FIG. 23.

FIG. 24 illustrates the fundamental mode profile of the above-described fiber, achieved by mode anti-crossing owing to the difference in the wall thicknesses $t_1$, $t_2$ of the outer tubular elements 5 of the respective pairs of the nested tubular arrangements 11a-d.

In one embodiment the relationship of the wall thickness $t_1$ of the outer tubular elements 5 of the one pair of the nested tubular arrangements 11b, d to the wall thickness $t_2$ of the outer tubular elements 5 of the other pair of the nested tubular arrangements 11a, c is 0.5 $t_2 < t_1 < t_2$ or 1.5 $t_2 > t_1 > t_2$, optionally 0.4 $t_2 < t_1 < t_2$ or 1.4 $t_2 > t_1 > t_2$, optionally 0.3 $t_2 < t_1 < t_2$ or 1.3 $t_2 >> t_1 > t_2$, and optionally $t_1 < 0.9$ $t_2$ or $t_1 > 1.1$ $t_2$.

In this embodiment the wall thickness $t_1$ of the outer tubular elements 5 of the one pair of the nested tubular arrangements 11b, d is 1.42 μm, and the wall thickness $t_2$ of the outer tubular elements 5 of the other pair of the nested tubular arrangements 11a, c is 1.172 μm.

In one embodiment the core radius R is at most about 15 times the signal wavelength λ, optionally at most about 7 times, optionally at most about 5 times, where preferred wavelengths λ are about 0.5, 0.8, 1.06, 1.55 and 2 μm.

In this embodiment the core radius R is 7 μm.

In this embodiment the inner tubular elements 7, 15 of the nested tubular arrangements 11a-d have a wall thickness of 1.172 μm, the spacing d of the nested tubular arrangements 11a-d is, and the inter-tubular spacing Z between the tubular elements 5, 7, 15 is 0.65 R.

In this embodiment the fiber achieves a phase bi-refringence of $1.54 \times 10^{-4}$, which is comparable to that of conventional solid polarizing-maintaining fibers, and a loss of approximately 0.01 dB/m at 1.55 μm, which is remarkable for a hollow-core fiber with such a small core.

FIG. 25 illustrates a fiber in accordance with a ninth embodiment of the present invention.

The fiber of this embodiment is similar in structure to the fiber of the eighth-described embodiment and differs in that the sectional size and/or shape of at least one tubular element 5, 7, 15 of the other pair of nested tubular arrangements 11a, c, orthogonal to the one pair of nested tubular arrangements 11b, d, is different to that of the counterpart at least one tubular element 5, 7, 15 of the one pair of nested tubular arrangements 11b, d.

In this embodiment one of the inner tubular elements 7, 15 of the other pair of nested tubular arrangements 11a, c, here the innermost tubular element 15, is of different sectional size, whereby a spacing $Z_1$ between the one innermost tubular element 15 and the adjacent tubular element 7 of the other pair of nested tubular arrangements 11a, c is different to a spacing $Z_2$ between the counterpart one innermost tubular element 15 and the adjacent tubular element 7 of the one pair of nested tubular arrangements 11b, d.

In this embodiment the innermost tubular elements 15 of the other pair of nested tubular arrangements 11a, c are sized such that the spacing $Z_1$ between those innermost tubular elements 15 and the adjacent tubular elements 7 is 1.74 R.

In this embodiment the relationship of the spacing $Z_1$ of the other pair of nested tubular arrangements 11a, c to the spacing $Z_2$ of the one pair of nested tubular arrangements 11b, d is $Z_1 > 1.2$ $Z_2$, optionally $Z_1 > 1.5$ $Z_2$, optionally $Z_1 > 2$ $Z_2$, optionally $Z_1 > 2.5$ $Z_2$.

With this configuration, the one pair of nested tubular arrangements 11b, d functions, in the one direction of those tubular arrangements 11b, d, to maintain polarization by virtue of the differently-sized outer tubular elements 5 of those tubular arrangements 11b, d, and the other pair of nested tubular arrangements 11a, c functions, in the other, orthogonal direction of those tubular arrangements 11a, c, to achieve phase matching between core and clad guided modes and thus out couple core fields into the those tubular arrangements 11a, c, thereby introducing large losses in the other direction and introducing a single polarization to a source signal.

FIGS. 26(a) and (b) illustrate respectively the modal intensity profile and the electric field direction of the high-loss (y-polarised) and low-loss (x-polarised) orthogonal polarizations of the fundamental mode of the fiber of FIG. 25.

FIGS. 27(a) to (c) illustrate respectively the phase bi-refringence (PB), the loss and the loss ratio of the fiber of FIG. 25 as a function of wavelength in the range of between 1.5 μm and 1.6 μm.

As illustrated, the fiber of this embodiment exhibits surprising and significant optical properties, having a fairly broad spectral range, with large bi-refringence, low fundamental mode loss and a large loss differential which extends across the entire C-band and to the first half of the L-band.

In the fiber of this embodiment the slightly-different mode size for one polarization in the one direction, arising from the different thickness of the outer tubular elements 5 of the one pair of nested tubular arrangements 11a-d, prevents coupling to cladding modes and maintains a low loss, whereas, in the perpendicular polarization, in contrast, the core-to-clad out-coupling process introduces a much larger loss and so introduces a single polarization to a source signal.

As will be see, the phase bi-refringence is comparable to that of conventional, solid polarizing-maintaining fibers, with a relatively small variance between $1.4 \times 10^{-4}$ and $1.7 \times 10^{-4}$ over the wavelengths between 1.5 μm and 1.6 μm.

As will also be seen, the lowest loss polarization has a loss as low about 0.0076 dB/m at 1.55 μm. Although this loss is greater than that of the eighth-described embodiment, this increase in loss is counterbalanced by a much higher loss for the other polarization, being about 70 dB/m at 1.55 μm, with the loss ratio between polarizations of fundamental mode being as high as about 1000. With this loss, the fiber would exhibit a single polarisation even in meter-scale applications.

The fiber of this embodiment represents an anti-resonance fiber structure which provides polarization-maintaining and polarizing function, which has hitherto not been available.

Finally, it will be understood that the present invention has been described in its preferred embodiments and can be modified in many different ways without departing from the scope of the invention as defined by the appended claims.

The invention claimed is:

1. An anti-resonant hollow-core fiber comprising:
a first tubular cladding element having an internal cladding surface,
a plurality of second tubular elements attached to the internal cladding surface, the plurality of second tubular elements being arranged about the internal cladding surface such that adjacent ones of the plurality of second tubular elements are spaced apart from each other and collectively define a core of the first tubular cladding element,
a plurality of third tubular elements, each nested within a respective one of the plurality of second tubular elements, wherein each of the plurality of third tubular elements is attached to the respective one of the plurality of second tubular elements at a location at which the respective one of the plurality of second tubular elements is attached to the internal cladding surface, and
a plurality of fourth tubular elements attached to the internal cladding surface, wherein each of the plurality of fourth tubular elements is arranged about the internal cladding surface in spaced apart relation to each other and in spaced apart relation to each of the plurality of second tubular elements and each of the plurality of third tubular elements.

2. The fiber of claim 1, wherein each of the plurality of third and fourth tubular elements is smaller in cross-section than each of the plurality of second tubular elements.

3. The fiber of claim 2, wherein the plurality of third tubular elements are arranged in symmetrical relation to each other about the internal cladding surface.

4. The fiber of claim 3, wherein the plurality of fourth tubular elements are arranged in symmetrical relation to each other about the internal cladding surface.

5. The fiber of claim 4, wherein the plurality of third tubular elements and the plurality of fourth tubular elements are arranged relative to each other about the internal cladding surface in an alternating pattern such that each one of the plurality of fourth tubular elements is intermediate two of the plurality of third tubular elements.

6. The fiber of claim 4, wherein each of the plurality of fourth tubular elements is not disposed within respective ones of the plurality of third tubular elements.

7. The fiber of claim 5,
wherein one of the plurality of second tubular elements, one of the plurality of third tubular elements, and one of the plurality of fourth tubular elements together form a tubular element arrangement nested within the first tubular cladding element,
wherein the fiber includes a plurality of tubular element arrangements, and
wherein the plurality of tubular element arrangements are arranged in symmetrical relation to each other about the internal cladding surface.

8. The fiber of claim 7, wherein the fiber has only four tubular element arrangements.

9. The fiber of claim 8, wherein every one of the plurality of second tubular elements includes only one of the plurality of third tubular elements.

10. The fiber of claim 8, wherein one or more of the plurality of second, third or fourth tubular elements have different sectional shape.

11. The fiber of claim 10, wherein the first tubular cladding element is circular in section.

12. The fiber of claim 11, wherein each of the plurality of third tubular elements is and/or wherein each of the plurality of fourth tubular elements is circular in section.

13. The fiber of claim 7, wherein the plurality of second tubular elements and the plurality of third tubular elements have substantially a same wall thickness.

14. The fiber of claim 7, wherein a ratio of a spacing of adjacent second tubular elements and a wall thickness of the second tubular elements is greater than about 0.5.

15. The fiber of claim 7, wherein a ratio of the spacing of adjacent second tubular elements and a wall thickness of the second tubular elements is less than about 12.

16. An anti-resonant hollow-core fiber comprising:
a first hollow cladding structure having an internal cladding surface,
a plurality of second hollow structures attached to the internal cladding surface, the plurality of second hollow structures being arranged about the internal cladding surface such that adjacent ones of the plurality of second hollow structures are spaced apart from each other,
a plurality of third hollow structures, each nested within a respective one of the plurality of second hollow structures, wherein each of the plurality of third hollow structures is attached to the respective one of the plurality of second hollow structures at a location at which the respective one of the plurality of second hollow structures is attached to the internal cladding surface, and
a plurality of fourth hollow structures attached to the internal cladding surface, each of the plurality of fourth hollow structures being arranged about the internal cladding surface in circumferentially offset relationship to the plurality of third hollow structures.

17. The fiber of claim 16, wherein each of the plurality of fourth hollow structures is arranged about the internal cladding surface in spaced apart relation to each other and in spaced apart relation to each of the plurality of second hollow structures and each of the plurality of third of hollow structures.

18. The fiber of claim 16, wherein each of the plurality of second, third, and fourth hollow structures is an anti-resonance structure that is intermediate the internal cladding surface and a hollow core of the first hollow cladding structure.

19. An anti-resonant hollow-core fiber comprising:
a first cladding structure having an internal cladding surface and a hollow core,
a plurality of second wall structures attached to the internal cladding surface to respectively define a plurality of second hollow areas, the plurality of second wall structures being arranged about the internal cladding surface such that adjacent ones of the plurality of second wall structures are spaced apart from each other, and
a plurality of third wall structures, each arranged within a respective one of the plurality of second hollow areas, the plurality of third wall structures respectively defining a plurality of third hollow areas, wherein each of the plurality of third wall structures is attached to the respective one of the plurality of second hollow areas at a location at which the respective one of the plurality of second hollow areas is attached to the internal cladding surface,
wherein each of the plurality of second hollow areas has an oval or elliptical shape in cross-section.

20. The fiber of claim 19, further comprising a plurality of fourth wall structures attached to the internal cladding surface to respectively define a plurality of fourth hollow areas, wherein each of the plurality of fourth wall structures is arranged about the internal cladding surface in spaced apart relation to each other and in spaced apart relation to each of the plurality of second wall structures and each of the plurality of third wall structures.

\* \* \* \* \*